US012711919B2

(12) United States Patent
Kim et al.

(10) Patent No.: US 12,711,919 B2

(45) Date of Patent: Aug. 18, 2026

(54) DISPLAY DEVICE, DRIVING METHOD OF DISPLAY DEVICE AND ELECTRONIC DEVICE

(71) Applicant: Samsung Display Co., Ltd., Yongin-si (KR)

(72) Inventors: Hyo Jung Kim, Yongin-si (KR); Tae Young Kim, Yongin-si (KR); Hyesun Sung, Yongin-si (KR); Hyeong-Yun Lee, Yongin-si (KR); Hyuncheol Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/260,064

(22) Filed: Jul. 3, 2025

(65) Prior Publication Data

US 2026/0011309 A1 Jan. 8, 2026

(30) Foreign Application Priority Data

Jul. 4, 2024 (KR) ........................ 10-2024-0088221

(51) Int. Cl.

*G09G 3/3233* (2016.01)
*G09G 3/3266* (2016.01)

(52) U.S. Cl.

CPC ......... *G09G 3/3233* (2013.01); *G09G 3/3266* (2013.01); *G09G 2300/0426* (2013.01);

(Continued)

(58) Field of Classification Search

CPC ...... G09G 3/3233; G09G 3/32; G09G 3/3208; G09G 3/3266; G09G 2300/0426;

(Continued)

(56) References Cited

U.S. PATENT DOCUMENTS

2022/0270552 A1* 8/2022 Roh ..................... G09G 3/3266
2023/0316989 A1* 10/2023 Son ......................... G09G 3/32 345/55

FOREIGN PATENT DOCUMENTS

KR 10-2004-0037295 A 5/2004
KR 10-2005-0014272 A 2/2005

(Continued)

*Primary Examiner* — Koosha Sharifi-Tafreshi

(74) *Attorney, Agent, or Firm* — Womble Bond Dickinson (US) LLP

(57) ABSTRACT

The present disclosure relates to a display device, a driving method of a display device, and an electronic device. The display device includes: a gate driver transmitting a third gate signal to a third gate line, and a data driver, the pixel including: a first transistor including a first electrode connected to a first node, a second electrode connected to a second node, and a first gate electrode connected to a third node, a third transistor including a first electrode connected to the second node, a second electrode connected to the third node, and a third gate electrode connected to the third gate line, and a light emission control transistor connected to the first node or the second node and including a light emission control gate electrode, the gate driver outputting during an operation period, and not outputting during a blank period between the operation periods of adjacent frames, the third gate signal includes a first turn-on voltage level period during a non-light emitting period.

20 Claims, 28 Drawing Sheets

(52) U.S. Cl.
CPC ............... *G09G 2300/0819* (2013.01); *G09G 2300/0861* (2013.01); *G09G 2310/08* (2013.01); *G09G 2320/0257* (2013.01); *G09G 2320/045* (2013.01)

(58) Field of Classification Search
CPC ... G09G 2300/0819; G09G 2300/0861; G09G 2310/08; G09G 2320/0257; G09G 2320/045; G09G 2300/0809; G09G 2310/0267; G09G 2310/0278; G09G 2310/06; G09G 2320/043; H10D 30/6755; H10D 86/471
See application file for complete search history.

(56) References Cited

FOREIGN PATENT DOCUMENTS

| | | | |
|---|---|---|---|
| KR | 10-2007-0032880 | A | 3/2007 |
| KR | 10-2022-0049645 | A | 4/2022 |
| KR | 10-2022-0062212 | A | 5/2022 |
| KR | 10-2023-0064708 | A | 5/2023 |
| KR | 10-2023-0076916 | A | 6/2023 |

* cited by examiner

DISPLAY DEVICE, DRIVING METHOD OF DISPLAY DEVICE AND ELECTRONIC DEVICE

CROSS-REFERENCE TO RELATED APPLICATION

The present application claims priority to and the benefit of Korean Patent Application No. 10-2024-0088221, filed on Jul. 4, 2024, in the Korean Intellectual Property Office, the entire disclosure of which is incorporated herein by reference.

BACKGROUND

(a) Field

Aspects of some embodiments of the present disclosure relate to a display device, a driving method of a display device, and an electronic device.

(b) Description of the Related Art

A display device is a device that displays images and includes a display panel that includes a plurality of pixels capable of displaying the images. The display device may be included in an electronic device for a variety of purposes.

Each pixel may include a pixel circuit part including a plurality of transistors and a light emitting element connected thereto. The plurality of transistors in the pixel circuit may be connected to various signal lines, including data lines and scan lines, and power lines or voltage lines, and may transmit a driving current to the light emitting element. The light emitting element emits light by flowing the driving current depending on a data signal, and the display panel may display images.

The above information disclosed in this Background section is only for enhancement of understanding of the background and therefore the information discussed in this Background section does not necessarily constitute prior art.

SUMMARY

Aspects of some embodiments may improve an afterimage of the image displayed by the display device by suppressing abnormal behavior or degradation of the transistor included in the pixel circuit part of the display device.

A display device according to some embodiments includes a display panel including plurality of pixels, a plurality of gate lines, and a plurality of data lines, a gate driver capable of generating a third gate signal and transmitting it to a third gate line included in the plurality of gate lines, and a data driver capable of generating a data signal and transmitting it to the plurality of data lines, wherein the pixel includes a first transistor including a first electrode connected to a first node, a second electrode connected to a second node, and a first gate electrode connected to a third node, a third transistor including a first electrode connected to the second node, a second electrode connected to the third node, and a third gate electrode connected to the third gate line, and a light emission control transistor connected to the first node or the second node and including a light emission control gate electrode that receives a light emission control signal, the gate driver outputs a gate signal to the plurality of gate lines during an operation period of each frame, and does not output the gate signal to the plurality of gate lines during a blank period between the operation periods of adjacent frames, the third gate signal includes a first turn-on voltage level period during a non-light emitting period that the light emission control signal is in a turn-off voltage level, and includes an additional pulse period positioned in at least one of a light emitting period that the light emission control signal is in the turn-on voltage level and the blank period.

A driving method of a display device according to some embodiments includes, in a display device including a display panel including a plurality of pixels, a plurality of gate lines, and a plurality of data lines, a gate driver, and a data driver, wherein the pixel includes a first transistor including a first electrode connected to a first node, a second electrode connected to a second node, and a first gate electrode connected to a third node, a third transistor including a first electrode connected to the second node, a second electrode connected to the third node, and a third gate electrode connected to a third gate line included in the plurality of gate lines, and a light emission control transistor connected to the first node or the second node and including a light emission control gate electrode that receives a light emission control signal, generating a third gate signal by the gate driver to be transmitted to the third gate line, and generating a data signal by the data driver to be transmitted to the plurality of data lines, the gate driver outputs a gate signal to the plurality of gate lines during an operation period of each frame, and does not output the gate signal to the plurality of gate lines during a blank period between the operation periods of adjacent frames, and the third gate signal includes a first turn-on voltage level period during a non-light emitting period wherein the light emission control signal is in a turn-off voltage level, and includes an additional pulse period positioned in at least one of a light emitting period wherein the light emission control signal is in a turn-on voltage level and the blank period.

According to some embodiments, the additional pulse period may include an on-pulse of at least one turn-on voltage level.

According to some embodiments, the pulse width of the on-pulse may be smaller than the width of the first turn-on voltage level period.

According to some embodiments, the blank period may include a first porch period positioned after the operation period of each frame, and a second porch period positioned before the operation period of each frame, and the additional pulse period may be positioned in the first porch period.

According to some embodiments, the first porch period may be included within the light emitting period.

According to some embodiments, the operation period may include an address scan period in which the third gate signal includes the first turn-on voltage level period, and a self-scan period in which the third gate signal does not include the first turn-on voltage level period, and the additional pulse period may be positioned within at least one of the light emitting period included in the address scan period and the light emitting period included in the self-scan period.

According to some embodiments, the additional pulse period may be positioned (e.g., occurred) once every one frame to five frames.

According to some embodiments, the third transistor may be an N-type transistor including an oxide semiconductor.

According to some embodiments, the third transistor may include a bottom gate electrode positioned on a substrate, a first insulating layer positioned on the bottom gate electrode, a semiconductor layer positioned on the first insulating layer, a second insulating layer positioned on the semiconductor layer, and a top gate electrode positioned on the second insulating layer, and a thickness of the first insulating layer is smaller than a thickness of the second insulating layer.

According to some embodiments, the bottom gate electrode and the top gate electrode may receive the same third gate signal.

An electronic device according to some embodiments comprises: a display module; and a processor electrically connected to the display module, wherein the display module comprises: a display panel including a plurality of pixels, a plurality of gate lines, and a plurality of data lines; a gate driver configured to generate a third gate signal and to transmit it to a third gate line included in the plurality of gate lines; and a data driver configured to generate a data signal and to transmit it to the plurality of data lines, wherein the pixel includes: a first transistor including a first electrode connected to a first node, a second electrode connected to a second node, and a first gate electrode connected to a third node; a third transistor including a first electrode connected to the second node, a second electrode connected to the third node, and a third gate electrode connected to the third gate line; and a light emission control transistor connected to the first node or the second node and including a light emission control gate electrode configured to receive a light emission control signal, wherein the gate driver is further configured to output a gate signal to the plurality of gate lines during an operation period of each frame, and to not output the gate signal to the plurality of gate lines during a blank period between the operation periods of adjacent frames, and the third gate signal includes a first turn-on voltage level period during a non-light emitting period wherein the light emission control signal is in a turn-off voltage level, and includes an additional pulse period positioned in at least one of a light emitting period wherein the light emission control signal is in a turn-on voltage level and the blank period.

According to some embodiments, an afterimage of an image displayed by a display device may be relatively improved (or reduced) by suppressing abnormal behavior or degradation of the transistor included in the pixel circuit part of the display device.

DETAILED DESCRIPTION

Figure 1:
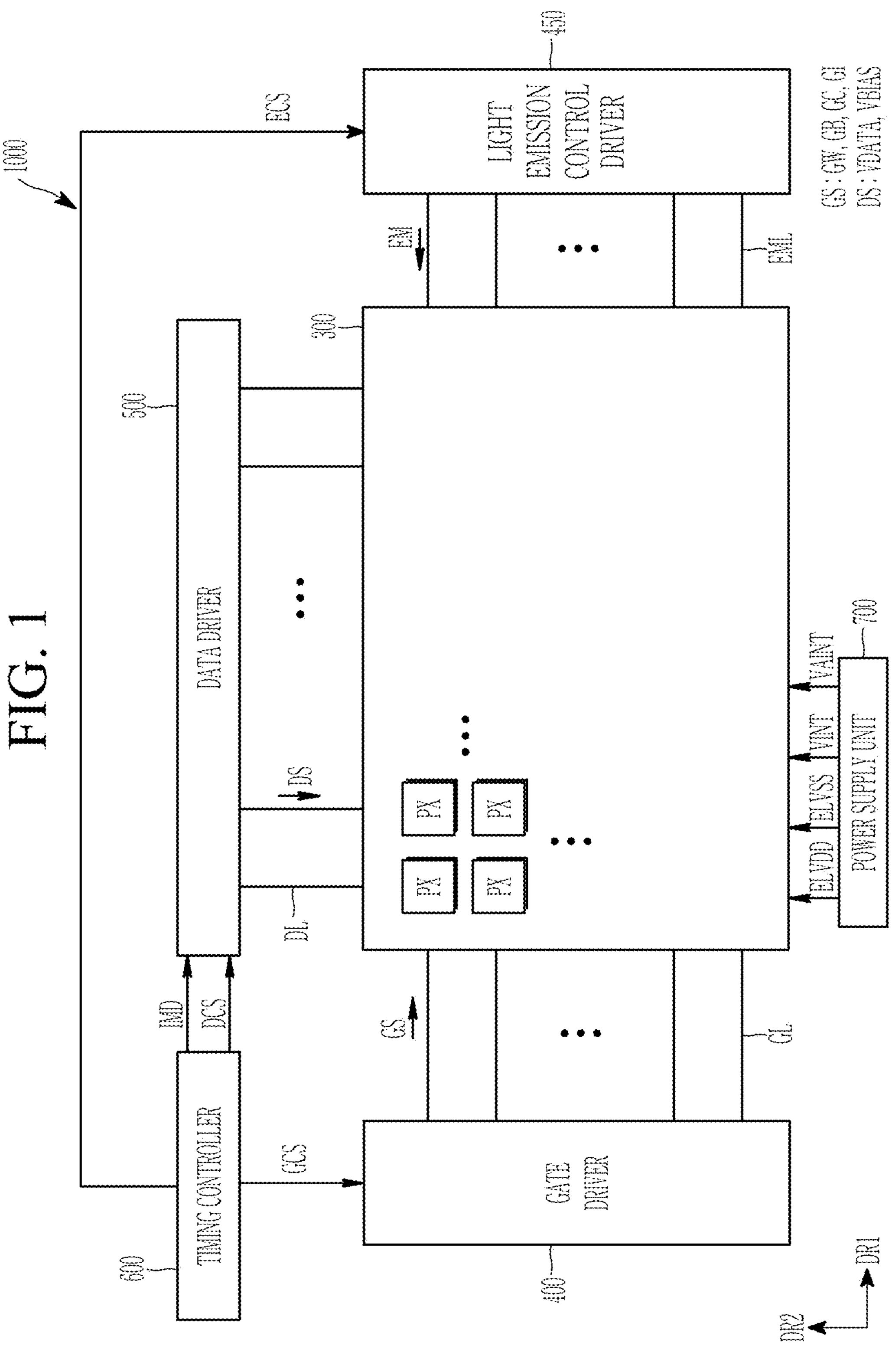
FIG. 1 is a block diagram of a display device according to some embodiments.

Aspects of some embodiments of the present disclosure will be described more fully hereinafter with reference to the accompanying drawings, in which aspects of some embodiments of the disclosure are shown. As those skilled in the art would realize, the described embodiments may be modified in various different ways, all without departing from the spirit or scope of embodiments according to the present disclosure.

For the sake of clarity, parts unrelated to the description of the disclosed embodiments may not be shown, and like reference numerals designate like elements throughout the specification.

The size and thickness of the configurations are optionally shown in the drawings for convenience of description, and the present disclosure is not limited to the drawings. In the drawings, the thicknesses of layers, films, panels, regions, etc., are exaggerated for clarity. In the drawings, for better understanding and ease of description, the thicknesses of some layers and areas are exaggerated.

It should be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly stated to the contrary, the word "comprise," and variations such as "comprises" or "comprising," should be understood to imply the inclusion of stated elements but not the exclusion of any other elements.

Also, throughout the specification, the phrase "on a plane" may mean when an object portion is viewed from above, and in this description, it may mean a plane parallel to a first direction DR1 and a second direction DR2, and the phrase “in a cross-section” may mean when a cross-section taken by vertically cutting an object portion is viewed from the side and in this description, it may mean a cross-section that cuts the object portion in a direction parallel to a third direction DR3.

Now, a display device according to some embodiments is described with reference to FIG. 1.

FIG. 1 is a block diagram of a display device according to some embodiments.

A display device 1000 according to some embodiments may be an electronic device including a display surface for displaying an image in at least one surface, such as a smartphone, a television, a tablet personal computer (PC), a mobile phone, an image phone, an electronic book reader, a desktop PC, a laptop PC, a netbook computer, a workstation, a server, a personal digital assistant (PDA), a portable multimedia player (PMP), an MP3 player, a medical device, a camera, or a wearable device.

The display device 1000 according to some embodiments may be an emissive display device including an organic light emitting element or an inorganic light emitting element. However, embodiments according to the present disclosure are not limited thereto, and the display device 1000 may be various display devices such as a liquid crystal display, an electrophoretic display (EPD), etc. Additionally, the display device 1000 may be implemented as a flexible display device, a rollable display device, a curved display device, a transparent display device, a mirror display device, etc.

Referring to FIG. 1, a display device 1000 according to some embodiments may include a display panel 300, a gate driver (or a scan driver) 400, a data driver 500, a light emission control driver 450, a timing controller 600, and a power supply unit 700.

The display panel 300 may include a plurality of pixels PX, a plurality of gate lines GL which are connected to the pixels PX, a plurality of light emission control lines EML, and a plurality of data lines DL. For example, the gate lines GL may be extended along the first direction DR1, for example, and the data lines DL may be extended along the second direction DR2. The display panel 300 may display images in a direction (e.g., the third direction DR3 (see FIG. 6, etc.)) perpendicular to the first direction DR1 and the second direction DR2.

The pixel PX may emit light with a luminance corresponding to a data signal DS transmitted through the data lines DL in response to a gate signal GS transmitted through the gate lines GL. An area where the plurality of pixels PX are arranged may be referred to as a display area, and an area around the display area may be referred to as a peripheral area. The plurality of pixels PX may include pixels capable of emitting light of different colors. For example, the plurality of pixels PX may include pixels that may emit a red light, pixels that may emit a green light, pixels that may emit a blue light, etc.

A gate driver 400 may generate a gate signal (e.g., a gate signal of a turn-on voltage level that turns on the transistor) GS based on a first control signal GCS (or a scan control signal), and sequentially provide the gate signal GS to the gate lines GL. The (n)-th (where n is a natural number greater than or equal to 2) pixel row may be provided with a gate signal GS that is shifted by one horizontal time from the gate signal GS provided to the (n−1)-th pixel row. The first control signal GCS may include a gate start signal and a gate clock signal, and may be provided from a timing controller 600. The gate driver 400 may be positioned in the peripheral area of the display panel 300 and may include a plurality of integrated transistors. The gate signal GS may include a first gate signal GW, a second gate signal GB, a third gate signal GC, and a fourth gate signal GI.

The light emission control driver 450 may generate a light emission control signal (e.g., a light emission control signal of a turn-on voltage level for turning on a transistor) EM based on a third control signal ECS, and may sequentially provide the light emission control signal EM to the light emission control lines EML. The (n)-th pixel row may be provided with the light emission control signal EM that is shifted by one horizontal time from the light emission control signal EM provided to the (n−1)-th pixel row. The third control signal ECS may include a light emission control start signal, a light emission control clock signal, etc., and may be provided from the timing controller 600. The light emission control driver 450 may be positioned in the peripheral area of the display panel 300 and include a plurality of integrated transistors.

The data driver 500 may generate a data signal DS based on an image data IMD and a second control signal DCS provided from the timing controller 600, and may provide the data signal DS to the data lines DL. The second control signal DCS is a signal that controls the operation of the data driver 500 and may include a data start signal, a data clock signal, a load signal, etc. The data signal DS may include a data voltage VDAT in an address scan period and a bias voltage VBIAS in a self-scan period.

The timing controller 600 may control the operations of the gate driver 400, the data driver 500, and the light emission control driver 450. The timing controller 600 may receive input image data and a control signals from the outside, generate a first control signal GCS, a second control signal DCS, and a third control signal ECS based on the control signals, and convert the input image data to generate the image data IMD.

The power supply unit 700 may provide a driving voltage ELVDD, a common voltage ELVSS, a first initialization voltage VINT, and a second initialization voltage VAINT to the display panel 300.

At least one of the gate driver 400, the light emission control driver 450, the data driver 500, the timing controller 600, and the power supply unit 700 may be formed in the display panel 300 or connected to the display panel 300 through a flexible circuit board in a form of an integrated circuit (IC).

A circuit diagram of one pixel PX of the display device 1000 according to some embodiments is described with reference to FIG. 2 together with FIG. 1.

Figure 2:
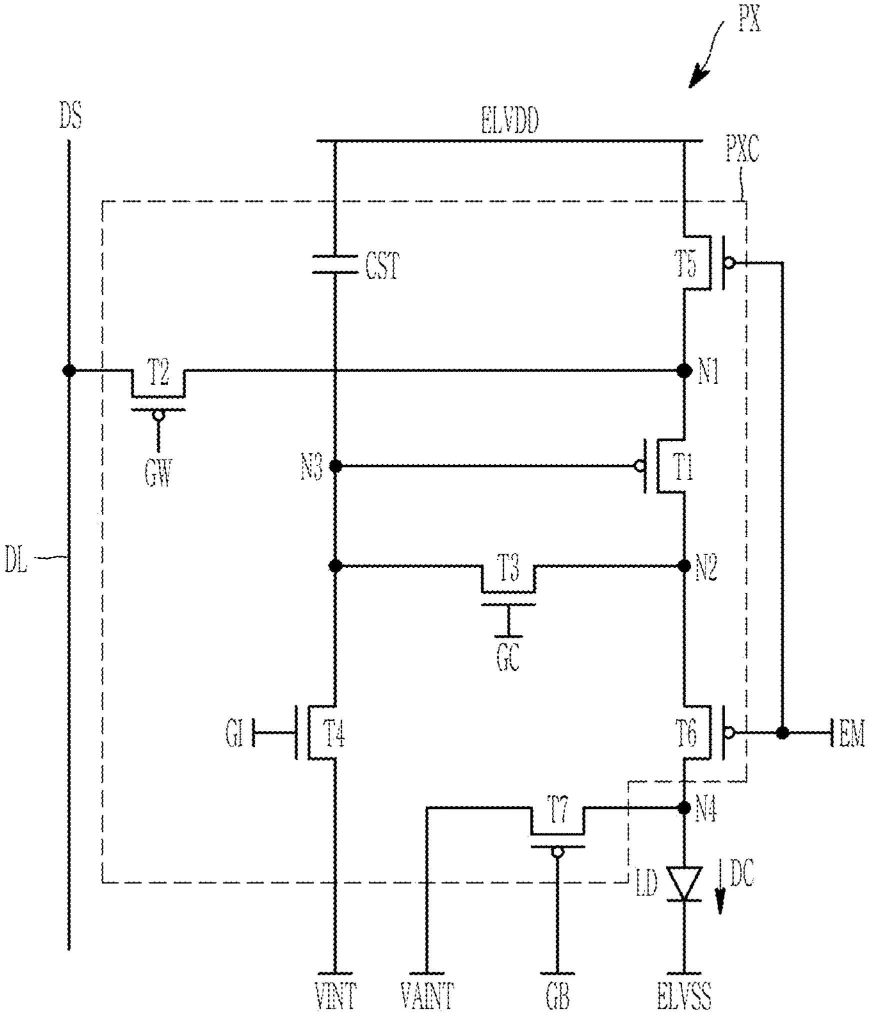
FIG. 2 is a circuit diagram of one pixel of a display device according to some embodiments.

FIG. 2 is a circuit diagram of one pixel of a display device according to some embodiments. Although FIG. 2 illustrates various components in a circuit diagram of a pixel PX according to some embodiments, embodiments according to the present disclosure are not limited thereto, and according to some embodiments the pixel PX may include additional components or fewer components without departing from the spirit and scope of embodiments according to the present disclosure.

Referring to FIG. 2, the pixel PX may include a pixel circuit part PXC and a light emitting element LD.

The pixel circuit part PXC may include a plurality of transistors, at least one capacitor, and a light emitting element LD. The plurality of transistors according to some embodiments may include a first transistor T1, a second transistor T2, a third transistor T3, a fourth transistor T4, a fifth transistor T5, a sixth transistor T6, and a seventh transistor T7, and at least one capacitor may include a storage capacitor CST.

The first electrode of the first transistor T1 may be connected to a first node N1, and the second electrode of the first transistor T1 may be connected to a second node N2. The gate electrode of the first transistor T1 may be connected to a third node N3. The first transistor T1 may generate a driving current DC based on the voltage between the third node N3 and the first node N1. The first transistor T1 may be referred to as the driving transistor.

The first electrode of the second transistor T2 may be connected to the data line DL that transmits the data signal DS, and the second electrode of the second transistor T2 may be connected to the first node N1. The gate electrode of the second transistor T2 may be connected to the first gate line that transmits the first gate signal GW. The second transistor T2 may write the data signal DS to the first node N1 in response to the first gate signal GW. The second transistor T2 may be referred to as a write transistor.

The first electrode of the third transistor T3 may be connected to the second node N2, and the second electrode of the third transistor T3 may be connected to the third node N3. The gate electrode of the third transistor T3 may be connected to the third gate line that transmits the third gate signal GC. The third transistor T3 may electrically connect the second electrode and the gate electrode of the first transistor T1 in response to the third gate signal GC.

The first electrode of the fourth transistor T4 may be connected to the first initialization voltage line that transmits the first initialization voltage VINT, and the second electrode of the fourth transistor T4 may be connected to the third node N3.

The gate electrode of the fourth transistor T4 may be connected to the fourth gate line that transmits the fourth gate signal GI. The fourth transistor T4 may initialize the third node N3 into the first initialization voltage VINT in response to the fourth gate signal GI.

The first electrode of the fifth transistor T5 may be connected to the driving voltage line that transmits the driving voltage ELVDD, and the second electrode of the fifth transistor T5 may be connected to the first node N1. The gate electrode of the fifth transistor T5 may be connected to the light emission control line EML which transmits the light emission control signal EM. The fifth transistor T5 may electrically connect the driving voltage line and the first node N1 in response to the light emission control signal EM.

The first electrode of the sixth transistor T6 may be connected to the second node N2, and the second electrode of the sixth transistor T6 may be connected to the fourth node N4. The gate electrode of the sixth transistor T6 may be connected to the light emission control line EML. The sixth transistor T6 may electrically connect the second node N2 and the fourth node N4 in response to the light emission control signal EM.

The fifth transistor T5 and the sixth transistor T6 are called light emission control transistors. At this time, the gate electrode of the fifth transistor T5 or the sixth transistor T6 may be referred to as a light emission control gate electrode.

The first electrode of the seventh transistor T7 may be connected to the second initialization voltage line that transmits the second initialization voltage VAINT, and the second electrode of the seventh transistor T7 may be connected to the fourth node N4. The gate electrode of the seventh transistor T7 may be connected to the second gate line that transmits the second gate signal GB. The seventh transistor T7 may initialize the fourth node N4 into the second initialization voltage VAINT in response to the second gate signal GB.

According to some embodiments, each of the first transistor T1, the second transistor T2, the fifth transistor T5, the sixth transistor T6, and the seventh transistor T7 may be a P-type transistor (e.g., a PMOS transistor), and each of the third transistor T3 and the fourth transistor T4 may be an N-type transistor (e.g., an NMOS transistor). In this case, a turn-on voltage level (or a gate-on voltage level) of each of the first transistor T1, the second transistor T2, the fifth transistor T5, the sixth transistor T6, and the seventh transistor T7 may be a logic low voltage, and a turn-on voltage level (or a gate-on voltage level) of each of the third transistor T3 and the fourth transistor T4 may be a logic high voltage.

The first electrode of the storage capacitor CST may be connected to the third node N3, and the second electrode of the storage capacitor CST may be connected to the driving voltage line. The storage capacitor CST may store the voltage of the third node N3.

The first electrode of the light emitting element LD may be connected to the fourth node N4, and the second electrode of the light emitting element LD may be connected to a common voltage line that transmits the common voltage ELVSS. The light emitting element LD may emit light based on the driving current DC. The light emitting element LD may emit light with the luminance corresponding to the driving current DC.

A driving method of the display device 1000 according to some embodiments is described with reference to FIG. 3 to FIG. 5 together with FIG. 1 and FIG. 2.

Figure 3:
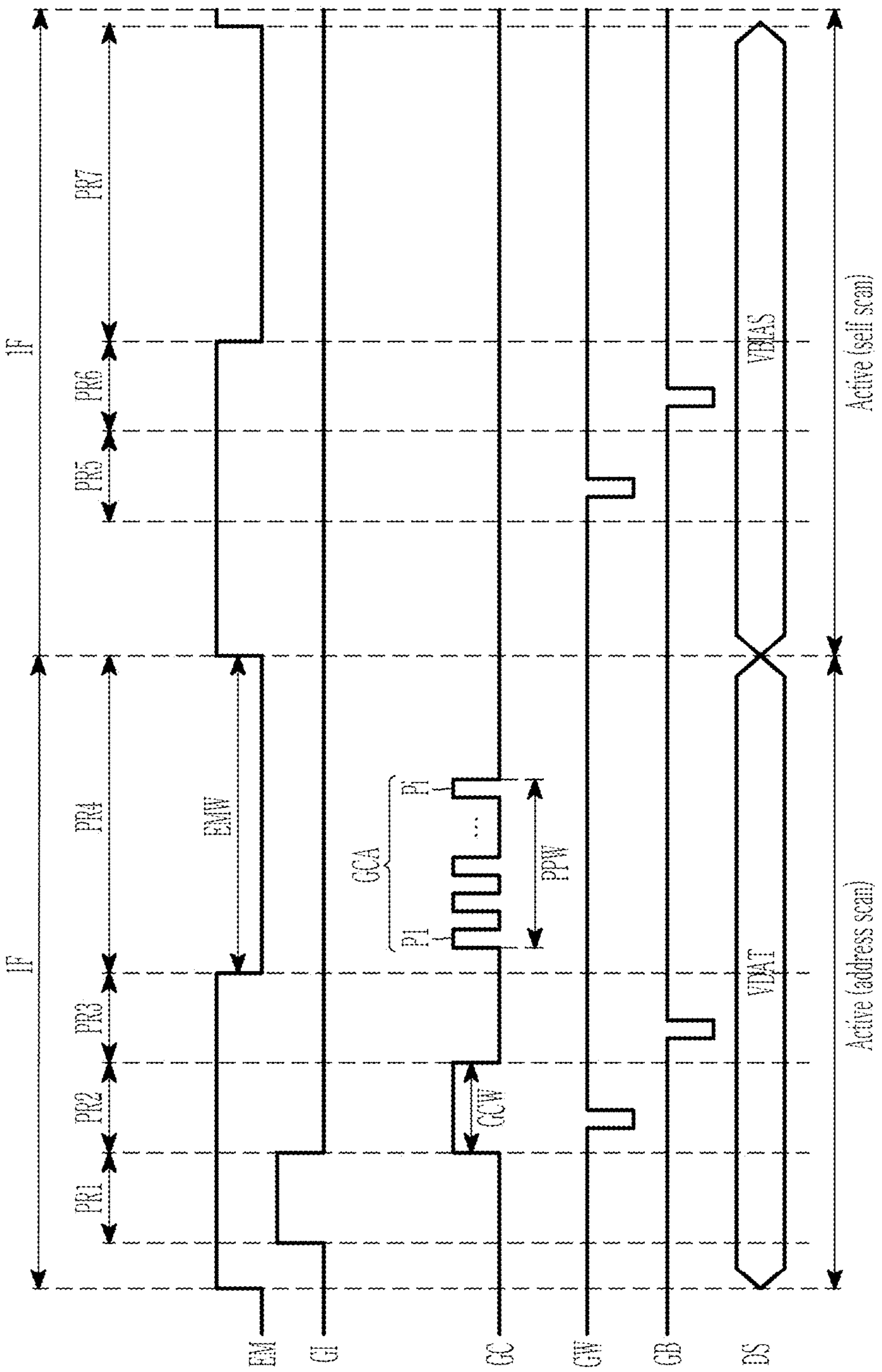
FIG. 3 is a waveform diagram of a gate signal and a light emission control signal applied to a pixel circuit part of a display device according to some embodiments.

FIG. 3 is a waveform diagram of a gate signal and a light emission control signal applied to a pixel circuit part of a display device according to some embodiments. FIG. 4 and FIG. 5 are circuit diagrams each showing an operating state of one pixel circuit part of a display device according to some embodiments.

An operation period (also referred to as an active period) Active of a pixel circuit part PXC of a display device 1000 according to some embodiments may include, as shown in FIG. 3, an address scan period (address scan) of at least one frame F and a self-scan period (self scan) of at least one frame F following the address scan period. According to some embodiments, the operation period Active of the pixel circuit part may include the address scan period (address scan) and the self-scan period (self scan) that alternate by frame.

According to some embodiments, the operation period Active of the pixel circuit part PXC may repeat only the address scan period (address scan) for each frame F. According to some embodiments, when the driving frequency of the display device 1000 is a maximum driving frequency (e.g., 240 Hz), the display device 1000 may be driven with the operation period of the address scan period (address scan) of each frame F. If the driving frequency of the display device 1000 is less than the maximum driving frequency, the display device 1000 may be driven by the address scan period (address scan) of one frame F (1F) and the operation period of the self-scan period (self-scan) of at least one frame F following it.

In the address scan period (address scan), the data voltage VDAT may be written to the driving transistor, and the light emitting element LD may emit light based on the driving current DC corresponding to the data voltage VDAT. In the self-scan period, the characteristics of the driving transistor may be changed by the bias voltage VBIAS, and the light emitting element LD may emit light based on the driving current DC corresponding to the data voltage VDAT written in the address scan period (address scan). The display device 1000 may display an image based on the data voltage VDAT during the address scan period (address scan), and maintain the image displayed during the address scan period (address scan) while changing the characteristic of the driving transistor during the self-scan period (self scan).

Referring to FIG. 3, the address scan period (address scan) may include a first period PR1, a second period PR2, a third period PR3, and a fourth period PR4.

In the first period PR1, the fourth transistor T4 may be turned on in response to the turn-on voltage level of the fourth gate signal GI, and the first initialization voltage VINT may be applied to the third node N3. Accordingly, the gate electrode of the first transistor T1 may be initialized in the first period PR1.

In the second period PR2, the third transistor T3 may be turned on in response to the turn-on voltage level of the third gate signal GC, and the first transistor T1 may be diode-connected. A period in which the third transistor T3 is turned on in response to the turn-on voltage level of the third gate signal GC in the second period PR2 may be referred to as a first turn-on voltage level period of the third transistor T3. Additionally, in the second period PR2, the second transistor T2 may be turned on in response to the turn-on voltage level of the first gate signal GW, and the data voltage VDAT, which the threshold voltage of the first transistor T1 is compensated, may be applied to the third node N3. Accordingly, in the second period PR2, the data voltage VDAT, for which the threshold voltage of the first transistor T1 is compensated, may be written to the storage capacitor CST.

Figure 4:
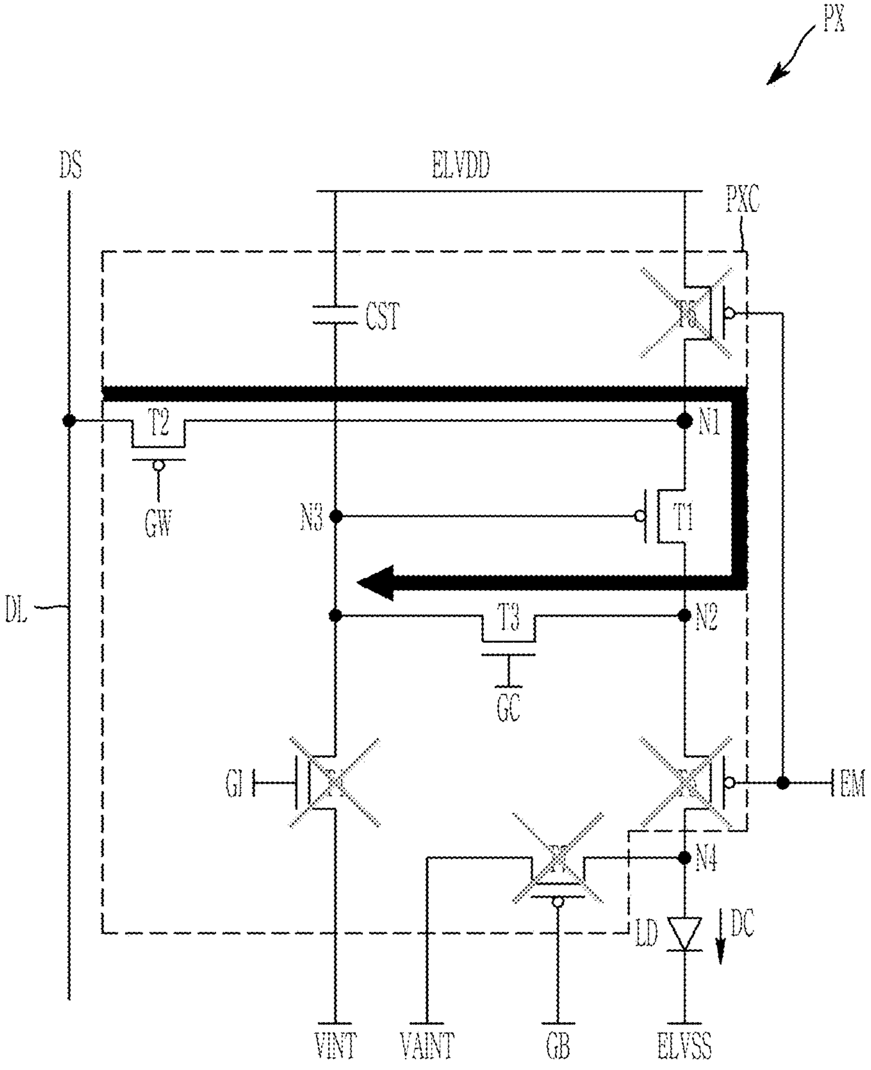
FIG. 4 is a circuit diagram showing an operating state of one pixel circuit part of a display device according to some embodiments.

FIG. 4 shows the operating status of the transistors T1 to T7 of the pixel circuit part PXC in the second period PR2.

In the third period PR3, the seventh transistor T7 may be turned on in response to the turn-on voltage level of the second gate signal GB, and the second initialization voltage VAINT may be applied to the fourth node N4. Accordingly, the first electrode of the light emitting element LD may be initialized in the third period PR3.

The first period PR1, the second period PR2, and the third period PR3 may be included in the non-light emitting period. That is, the first period PR1, the second period PR2, and the third period PR3 may be positioned within the period where the light emission control signal EM is in the turn-off voltage level. Herein, "a period A is positioned within a period B" has substantially the same or similar meaning as "a period A is positioned in a period B" or "a period A is in a period B".

In the fourth period PR4, the fifth transistor T5 and the sixth transistor T6 may be turned on in response to the turn-on voltage level of the light emission control signal EM, and the driving current DC corresponding to the voltage between the gate electrode and the first electrode of the first transistor T1 may flow to the light emitting element LD. Accordingly, in the fourth period PR4, the light emitting element LD may emit light with the luminance corresponding to the driving current DC. The fourth period PR4 is referred to as the light emitting period.

During the fourth period PR4, while the light emission control signal EM is in the turn-on voltage level (e.g., a logic low voltage), the third gate signal GC may include an additional pulse period GCA including at least one turn-on voltage level pulse (referred to as an on-pulse) P1, . . . , Pi (i is a natural number greater than or equal to 1, hereinafter the same). The pulse width of each of the on-pulses P1, . . . , Pi may be equal to or less than 1 horizontal time, but is not limited thereto. According to some embodiments, the pulse width of each of the on-pulses P1, . . . , Pi may be greater than 1 horizontal time. The width PPW of the additional pulse period GCA of the third gate signal GC may be smaller than or equal to the width EMW of the fourth period PR4—that is, the width while the light emission control signal EM is in the turn-on voltage level. The width PPW of the additional pulse period GCA of the third gate signal GC may be less than, equal to, or greater than the width GCW of the turn-on voltage level of the third gate signal GC in the second period PR2. The pulse width of each of the on-pulses P1, . . . , Pi may be smaller than the width GCW of the turn-on voltage level of the third gate signal GC in the second period PR2, but is not limited thereto.

The additional pulse period GCA of the third gate signal GC may be positioned once every frame F or every two or more frames F.

The self-scan period (self-scan) may include a fifth period PR5, a sixth period PR6, and a seventh period PR7.

In the fifth period PR5, the second transistor T2 may be turned on in response to the turn-on voltage level of the first gate signal GW, and the bias voltage VBIAS may be applied to the first node N1. Accordingly, in the fifth period PR5, the bias voltage VBIAS may be applied to the first electrode of the first transistor T1, so that the first transistor T1 may be on-biased. When the driving time of the first transistor T1 increases, the characteristic of the first transistor T1 may be fixed to a state (e.g., a set or predetermined state), and the luminance of light emitted from the light emitting element LD may increase or decrease by the shift and the hysteresis characteristic of the threshold voltage of the first transistor T1. As the first transistor T1 is on-biased by the bias voltage VBIAS in the fifth period PR5, the characteristics of the first transistor T1 may change, and accordingly, instances of the luminance of light emitted from the light emitting element LD increasing or decreasing due to the shift and hysteresis characteristic of the threshold voltage of the first transistor T1 may be prevented or reduced.

Figure 5:
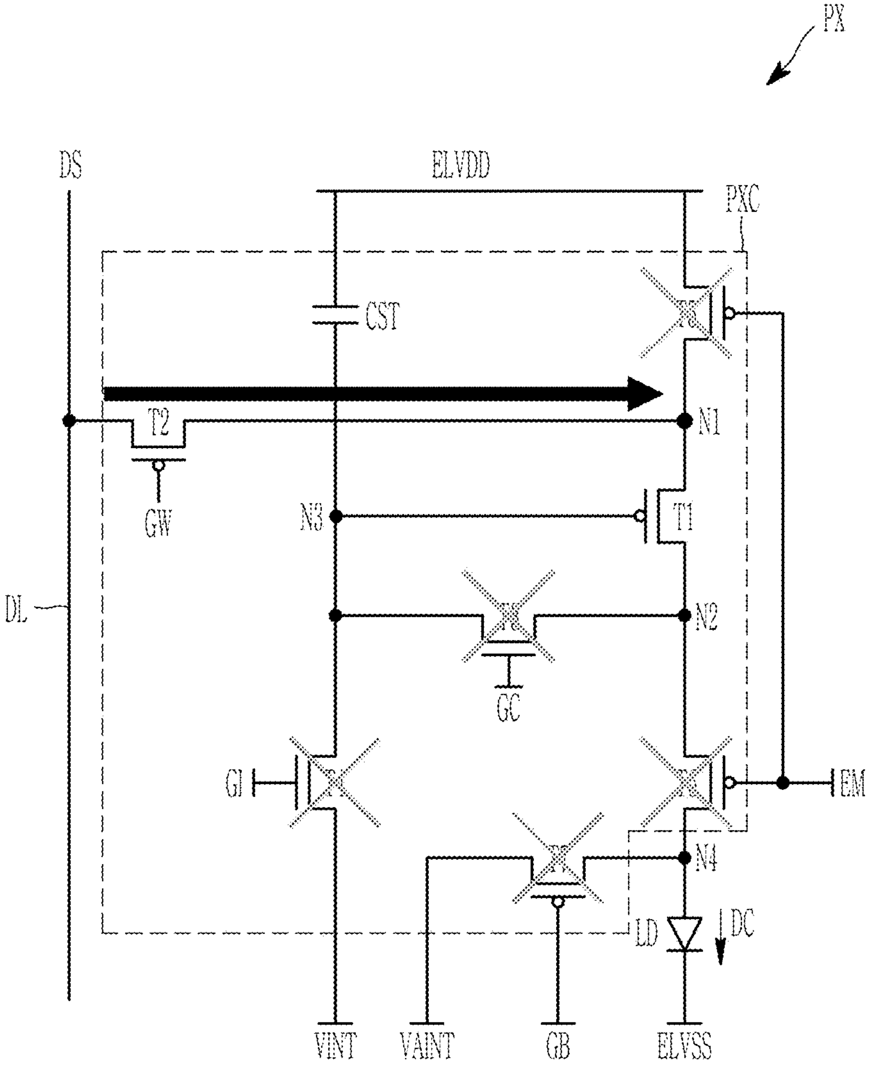
FIG. 5 is a circuit diagram showing an operating state of one pixel circuit part of a display device according to some embodiments.

FIG. 5 shows the operating status of the transistors T1 to T7 of the pixel circuit part PXC in the fifth period PR5.

In the sixth period PR6, the seventh transistor T7 may be turned on in response to the turn-on voltage level of the second gate signal GB, and the second initialization voltage VAINT may be applied to the fourth node N4. Accordingly, the first electrode of the light emitting element LD may be initialized in the sixth period PR6.

In the seventh period PR7, the fifth transistor T5 and the sixth transistor T6 may be turned on in response to the turn-on voltage level of the light emission control signal EM, and the driving current DC corresponding to the voltage between the gate electrode and the first electrode of the first transistor T1 may flow to the light emitting element LD. Accordingly, in the seventh period PR7, the light emitting element LD may emit light based on the driving current DC corresponding to the data voltage VDAT written to the storage capacitor CST in the address scan period (address scan). The seventh period PR7 is referred to as the light emitting period.

The effect of the additional pulse period GCA of the third gate signal GC according to the driving method of the display device 1000 according to some embodiments is described with reference to FIG. 6 to FIG. 9 along with the drawings described above.

Figure 6:
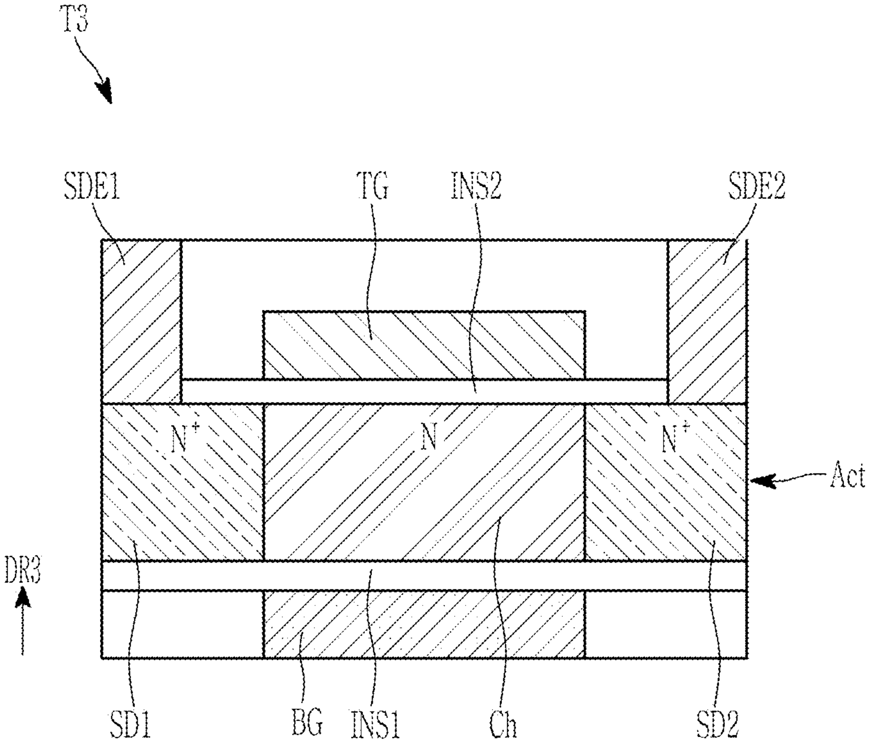
FIG. 6 is a cross-sectional view of a transistor of a pixel circuit part of a display device according to some embodiments.
Figure 7:
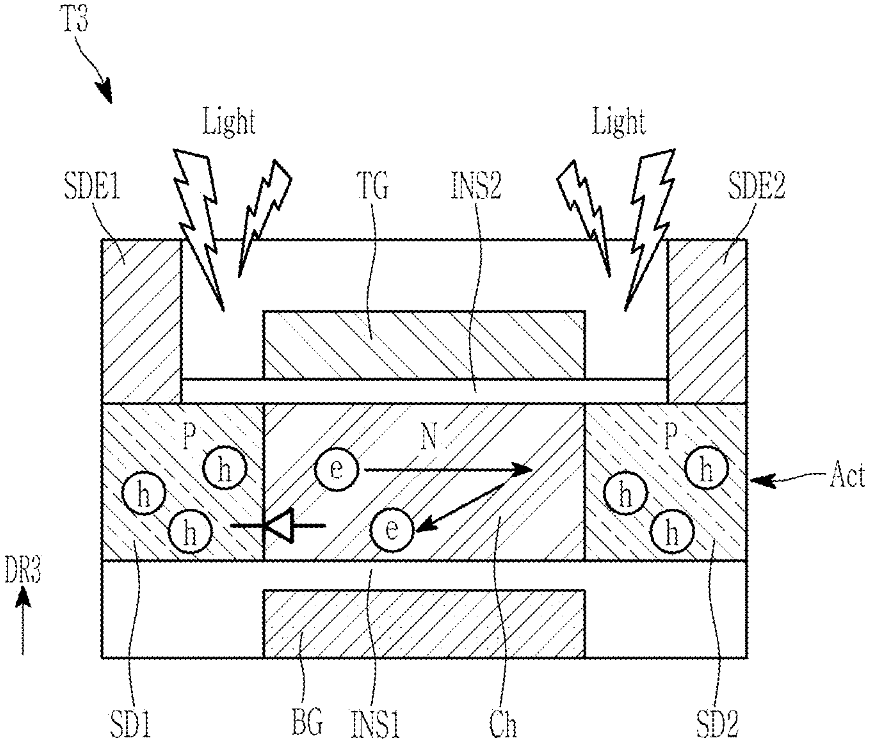
FIG. 7 is a cross-sectional view of a transistor of a pixel circuit part of a display device according to some embodiments, showing a movement of a charge upon exposure to light.
Figure 8:
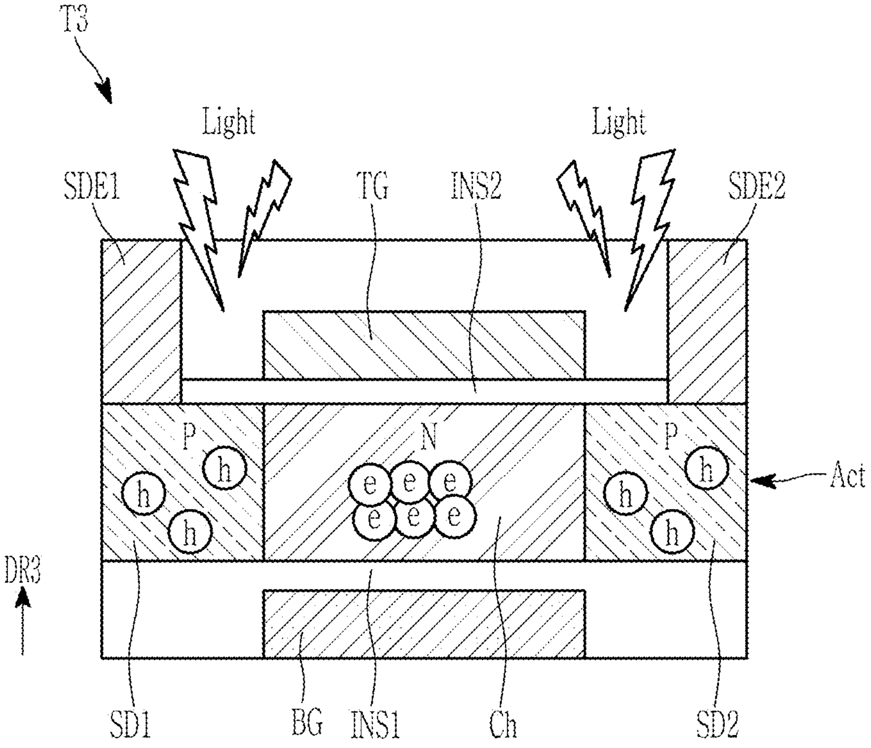
FIG. 8 is a cross-sectional view of a transistor of a pixel circuit part of a display device according to some embodiments, showing a charge accumulated upon exposure to light.
Figure 9:
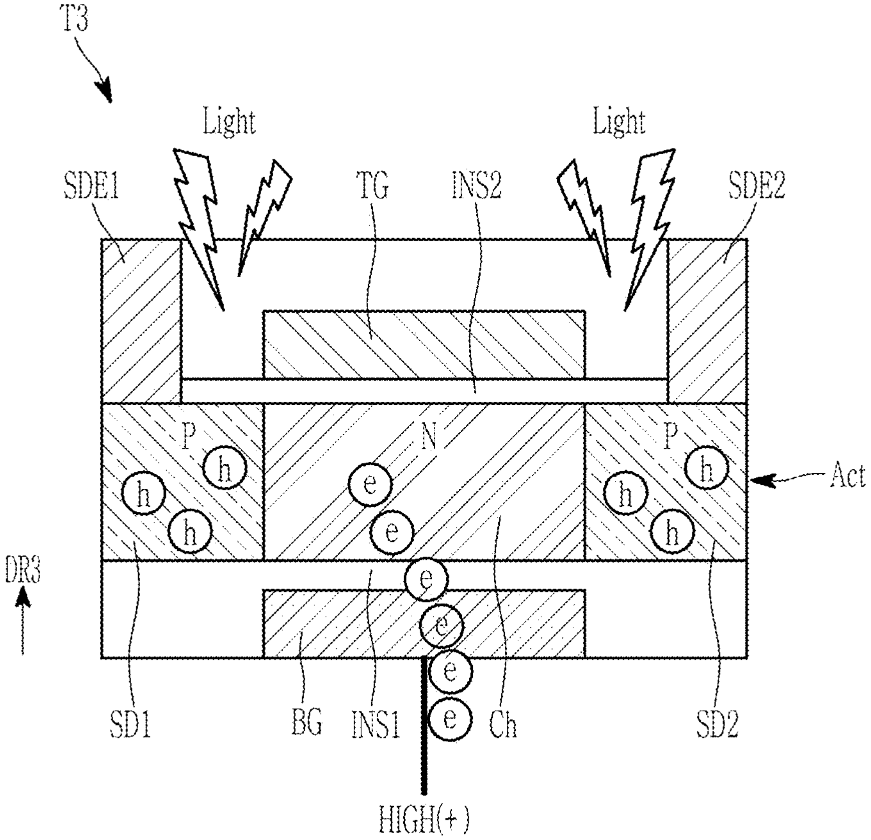
FIG. 9 is a cross-sectional view of a transistor of a pixel circuit part of a display device according to some embodiments, showing a movement of an accumulated charge.

FIG. 6 is a cross-sectional view of a transistor of a pixel circuit part of a display device according to some embodiments. FIG. 7 is a cross-sectional view of a transistor of a pixel circuit part of a display device according to some embodiments, showing a movement of a charge upon exposure to light. FIG. 8 is a cross-sectional view of a transistor of a pixel circuit part of a display device according to some embodiments, showing a charge accumulated upon exposure to light. FIG. 9 is a cross-sectional view of a transistor of a pixel circuit part of a display device according to some embodiments, showing a movement of an accumulated charge.

Referring to FIG. 6 to FIG. 9, a third transistor T3 of the display device 1000 according to some embodiments may include a bottom gate electrode BG positioned on a substrate, a first insulating layer INS1 positioned on the bottom gate electrode BG, a semiconductor layer Act positioned on the first insulating layer INS1, a second insulating layer INS2 positioned on the semiconductor layer Act, a top gate electrode TG positioned on the second insulating layer INS2, and a first data electrode SDE1 and a second data electrode SDE2 positioned on the semiconductor layer Act.

The bottom gate electrode BG and the top gate electrode TG may be electrically connected to each other and receive the same third gate signal GC. At least one of the bottom gate electrode BG and the top gate electrode TG may include a metal such as copper (Cu), molybdenum (Mo), aluminum (Al), silver (Ag), chromium (Cr), tantalum (Ta), or titanium (Ti) or metal alloy, and may be composed of a single layer or multiple layers.

The first insulating layer INS1 and the second insulating layer INS2 may include inorganic insulating materials such as silicon oxide (SiOx) and silicon nitride (SiNx).

The semiconductor layer Act may include a channel region Ch, and a first electrode SD1 and a second electrode SD2 facing each other via the channel region Ch therebetween. The semiconductor layer Act may include semiconductor materials such as amorphous silicon, polycrystalline silicon, and oxide semiconductors such as IGZO. According to some embodiments, the third transistor T3 may include the semiconductor layer Act including an oxide semiconductor material.

The first data electrode SDE1 may be in contact with and electrically connected to the first electrode SD1 of the semiconductor layer Act, and the second data electrode SDE2 may be in contact with and electrically connected to the second electrode SD2 of the semiconductor layer Act. At least one of the first data electrode SDE1 and the second data electrode SDE2 may contain a metal such as copper (Cu), molybdenum (Mo), aluminum (Al), silver (Ag), chromium (Cr), tantalum (Ta), or titanium (Ti) or metal alloy, and may be a single layer or may include multiple layers.

First, referring to FIG. 6, the third transistor T3 may be an N-type transistor (e.g., an NMOS transistor). The first electrode SD1 and/or the second electrode SD2 of the third transistor T3 may be doped with an $N^+$ impurity.

Next referring to FIG. 7, when a stress—for example, a light stress—is applied to the third transistor T3, photo-induced hole carriers h may be generated in the semiconductor layer Act (e.g., the first electrode SD1 and/or the second electrode SD2) that is not covered by the top gate electrode TG. Due to the photo-induced hole carriers h, the semiconductor layer Act of the third transistor T3 may form a PNP junction.

Next referring to FIG. 8, electrons e cannot escape from the semiconductor layer Act by the PNP junction and may be accumulated in the channel region Ch, particularly in a portion of the channel region Ch close to the bottom gate electrode BG. Then, the characteristics of the third transistor T3 may be degraded by the accumulated electrons e. In particular, abnormal behavior may occur in the Id-Vg characteristic curve of the third transistor T3, causing a period in which the threshold voltage (Vth) shifts in the positive direction. Then, the display quality may be degraded, such as the afterimage that the image of the previous frame remains on the image of the current frame displayed by the display device.

Referring to FIG. 9, according to the present embodiments, if an additional pulse period GCA is added to the third gate signal GC applied to the bottom gate electrode BG and the top gate electrode TG, electrons e accumulated in the channel region Ch may escape toward the bottom gate electrode BG and/or the top gate electrode TG, thereby suppressing the abnormal shift of the threshold voltage (Vth).

When electrons e are accumulated in the portion of the channel region Ch close to the bottom gate electrode BG, more electrons e may escape toward the bottom gate electrode BG. For the smooth emission of electron e, the thickness of the first insulating layer INS1 in the third direction DR3 may be smaller than the thickness of the second insulating layer INS2 in the third direction DR3.

Referring to FIG. 3, for the effective emission of the electrons e accumulated in the third transistor T3 and improvement of the afterimage, the additional pulse period GCA of the third gate signal GC may be positioned at least once every one but not more than five frames F.

The driving method of the display device 1000 according to some embodiments is described with reference to FIG. 10 along with the drawings described above.

Figure 10:
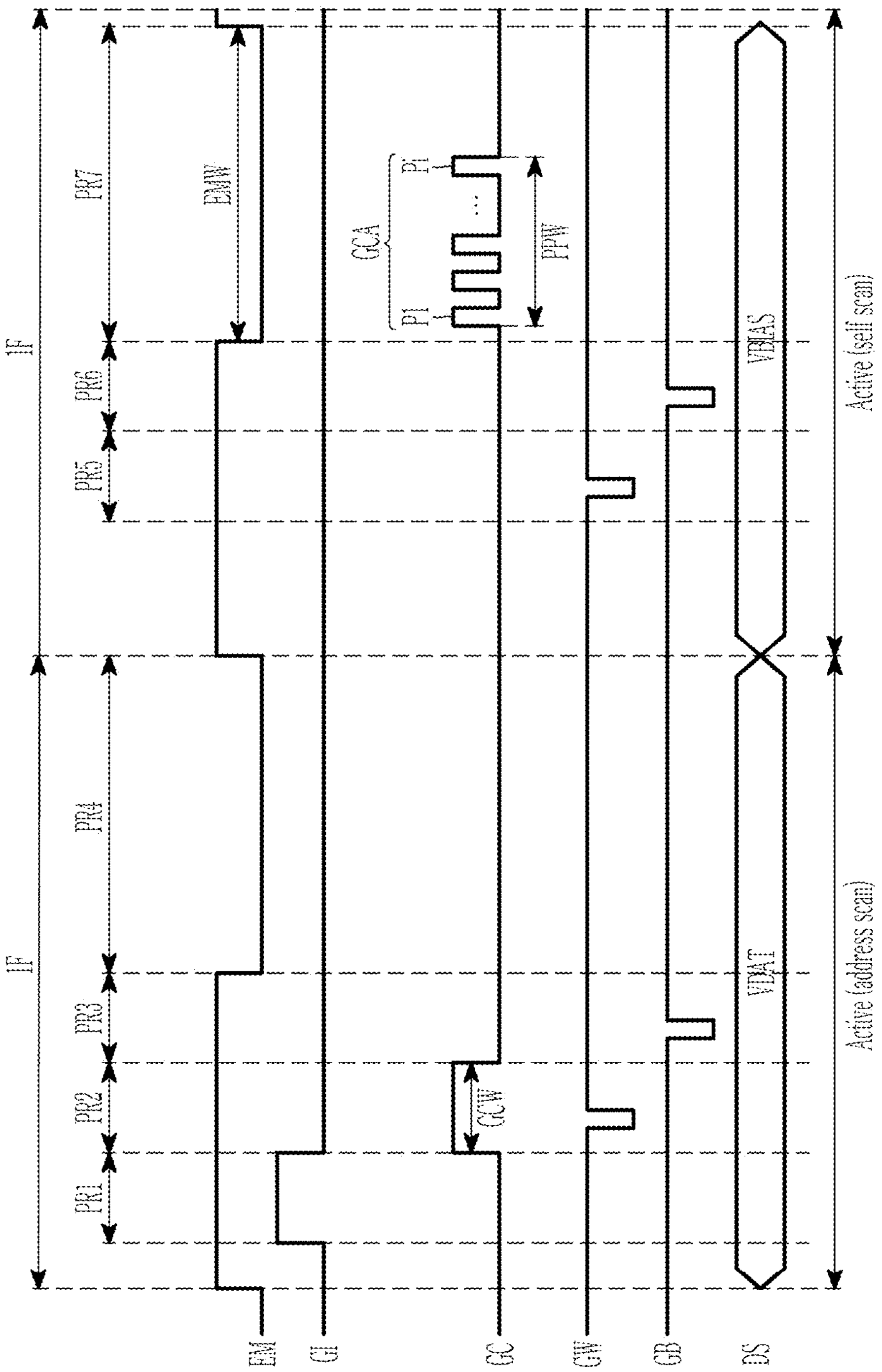
FIG. 10 is a waveform diagram of a gate signal and a light emission control signal applied to a pixel circuit part of a display device according to some embodiments.

FIG. 10 is a waveform diagram of a gate signal and a light emission control signal applied to a pixel circuit part of a display device according to some embodiments.

Referring to FIG. 10, the driving method according to some embodiments is mostly the same as the driving method of the display device according to some embodiments illustrated in FIG. 3 to FIG. 9 described above, but the position of the additional pulse period GCA of the third gate signal GC may be different.

For example, in the seventh period PR7 of the self-scan period, while the light emission control signal EM is in the turn-on voltage level (e.g., a logic low voltage), the third gate signal GC may include an additional pulse period GCA including at least one on-pulse P1, . . . , Pi. The pulse width of each of the on-pulses P1, . . . , Pi may be equal to or less than 1 horizontal time, but embodiments according to the present disclosure are not limited thereto. According to some embodiments, the pulse width of each of the on-pulses P1, . . . , Pi may be greater than 1 horizontal time.

The width PPW of the additional pulse period GCA of the third gate signal GC may be smaller than or equal to the width EMW of the seventh period PR7—that is, the width while the light emission control signal EM is in the turn-on voltage level. The width PPW of the additional pulse period GCA of the third gate signal GC may be smaller than, equal to, or larger than the width GCW of the turn-on voltage level of the third gate signal GC in the second period PR2 of the address scan period (address scan). The pulse width of each of the on-pulses P1, . . . , Pi may be smaller than the width GCW of the turn-on voltage level of the third gate signal GC in the second period PR2, but is not limited thereto.

Referring to FIG. 10, for the effective emission of the electrons (e) accumulated in the third transistor T3 and the improvement of the afterimage, the additional pulse period GCA of the third gate signal GC may be positioned at least once every one but not more than five frames F.

The driving method of the display device 1000 according to some embodiments is described with reference to FIG. 11 along with the drawings described above.

Figure 11:
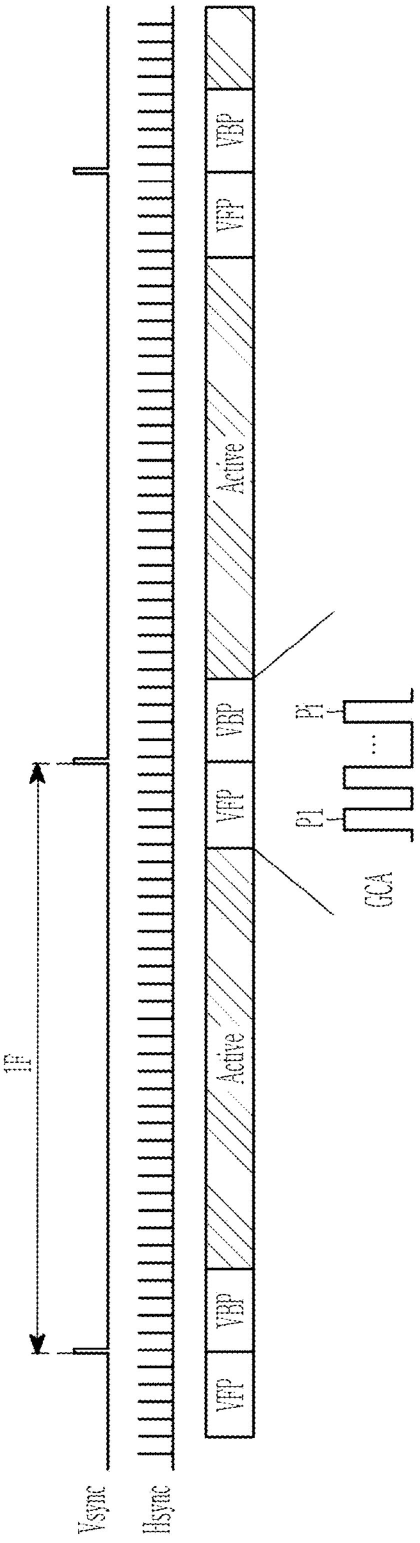
FIG. 11 is a timing diagram showing a synchronization signal input to a display device and an operation period of the display device depending thereon according to some embodiments.

FIG. 11 is a timing diagram showing a synchronization signal input to a display device and an operation period of the display device according to some embodiments.

The vertical synchronization signal Vsync defines a frame F period (or a starting point of a frame period) during which each frame image is displayed, and the horizontal synchronizing signal Hsync may define a horizontal period during which the gate driver 400 outputs the gate signal GS or the data driver 500 outputs the data signal DS. The horizontal synchronizing signal Hsync may be a pulse signal that periodically has a logic low level. The period of the horizontal synchronizing signal Hsync may be defined as 1 horizontal time.

In one frame F period, there may be a blank period where no gate signal GS is output between the operation period Active of the address scan period (address scan) or the self-scan period (self scan) and the adjacent operation period Active. The blank period may include a first porch period VFP and/or a second porch period VBP. The first porch period VFP may be positioned after the operation period Active of one frame 1F ends and before the next vertical synchronization signal Vsync pulse is applied, and the second porch period VBP may be positioned after the vertical synchronization signal Vsync pulse of one frame 1F is applied and before the operation period Active starts.

In the waveform diagram of FIG. 3 or FIG. 10 described above, the first porch period VFP may be a part after the end of the fourth period PR4 or the seventh period PR7, and the second porch period VBP may be a partial period before the start of the first period PR1 or the fifth period PR5. However, the positions of the first porch period VFP and the second porch period VBP are not limited thereto.

Referring to FIG. 11, according to some embodiments, the additional pulse period GCA of the third gate signal GC may be positioned in the first porch period VFP and/or the second porch period VBP. For example, the additional pulse period GCA of the third gate signal GC may be positioned only within the first porch period VFP, or only within the second porch period VBP, the additional pulse period GCA of third gate signal GC may be positioned in each of the first porch period VFP and the second porch period VBP, and the additional pulse period GCA of the third gate signal GC may be positioned over the entire span of the first porch period VFP and the second porch period VBP.

Particularly, the additional pulse period GCA of the third gate signal GC may be positioned within the first porch period VFP, in which case it may emit the electrons e accumulated in the first porch period VFP, which is the latter half of the light emitting period (e.g., the fourth period PR4 or the seventh period PR7) of each operation period Active, the afterimages may be improved more effectively in the display device 1000, and a risk of a color mixing may also be reduced.

According to some embodiments, the additional pulse period GCA of the third gate signal GC may be positioned in the period excluding the light emitting period of the operation period Active among the operation period Active and the blank period. As shown in FIG. 3 or FIG. 10, during the light emitting period when the light emission control signal EM has the turn-on level voltage, the third gate signal GC may include a turn-on voltage level period to compensate for the threshold voltage of the first transistor T1 in the second period PR.

The driving method of the display device according to some embodiments will be described with reference to FIG. 12 together with the drawings described above.

Figure 12:
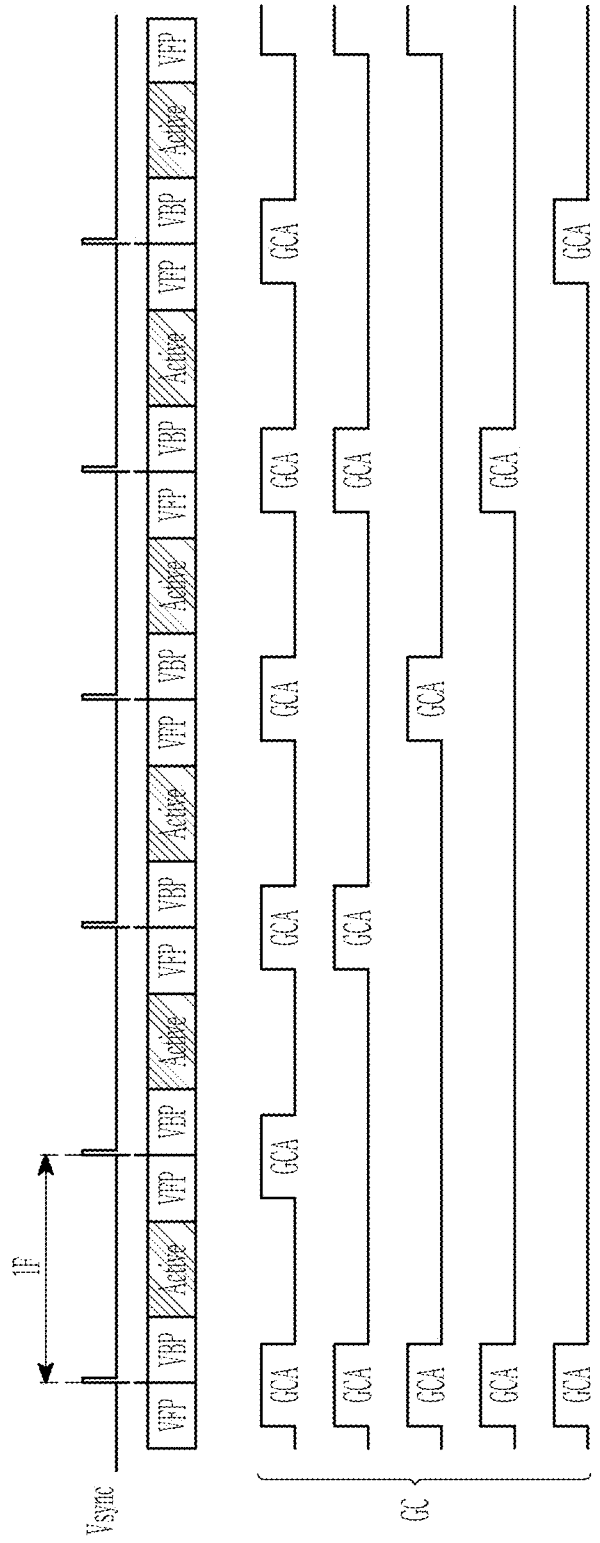
FIG. 12 is a timing diagram of an operation period of a display device and a gate signal applied to a pixel circuit part according to some embodiments.

FIG. 12 is a timing diagram of an operation period of a display device and a gate signal applied to a pixel circuit part according to some embodiments.

Referring to FIG. 12, the driving method of the display device according to the present embodiments is mostly the same as the embodiments described above, particularly the embodiments illustrated in FIG. 11, but for effective emission of the electrons e accumulated in the third transistor T3 and improvement of the afterimage, the additional pulse period GCA of the third gate signal GC may be positioned once every frame F (a first line), once every two frames F (a second line), once every three frames F (a third line), once every four frames F (a fourth line), or once every five frames F (a fifth line). That is, the additional pulse period GCA of the third gate signal GC may be positioned once every one to five frames F.

According to some embodiments, the width of the additional pulse period GCA illustrated in FIG. 12 may be adjusted to overlap only the first porch period VFP.

The driving method of the display device 1000 according to some embodiments of the present disclosure will be described in more detail with reference to FIG. 13 together with the drawings described above.

Figure 13:
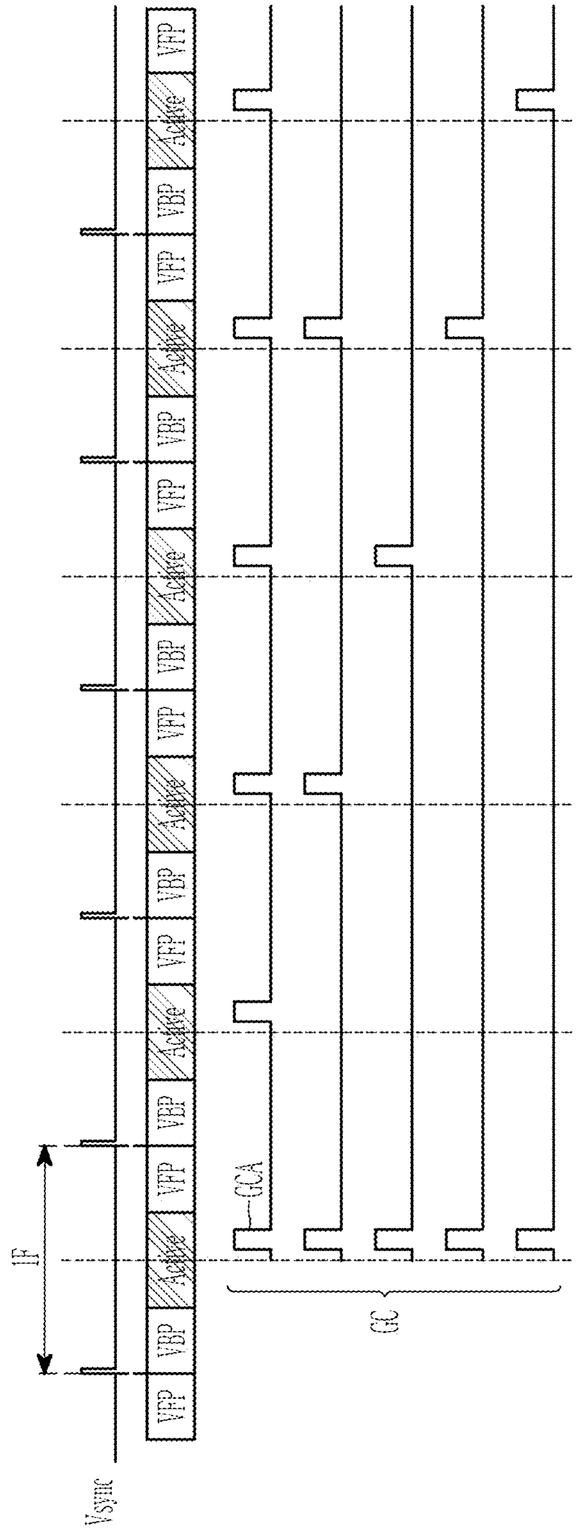
FIG. 13 is a timing diagram of an operation period of a display device and a gate signal applied to a pixel circuit part according to some embodiments.

FIG. 13 is a timing diagram of an operation period of a display device and a gate signal applied to a pixel circuit part according to some embodiments.

Referring to FIG. 13, the driving method of the display device according to the present embodiments is mostly the same as the embodiments described above, particularly the embodiments illustrated in FIG. 3 or FIG. 10, but for effective emission of the electrons e accumulated in the third transistor T3 and improvement of the afterimage, the additional pulse period GCA of the third gate signal GC may be positioned once every frame F (a first line), once every two frames F (a second line), once every three frames F (a third line), once every four frames F (a fourth line), or once every five frames F (a fifth line). That is, the additional pulse period GCA of the third gate signal GC may be positioned once every 1 to 5 frames F.

According to some embodiments as illustrated in FIG. 13, the additional pulse period GCA of the third gate signal GC may be positioned in the latter half of the operation period Active. The operation period Active may be one of the address scan period (address scan) and the self-scan period (self scan) described above, and the address scan period (address scan) and the self-scan period (self scan) may be repeated.

The planar and cross-sectional structures of the display device 1000 according to some embodiments of the present disclosure will be described with reference to FIG. 14 together with the drawings described above.

Figure 14:
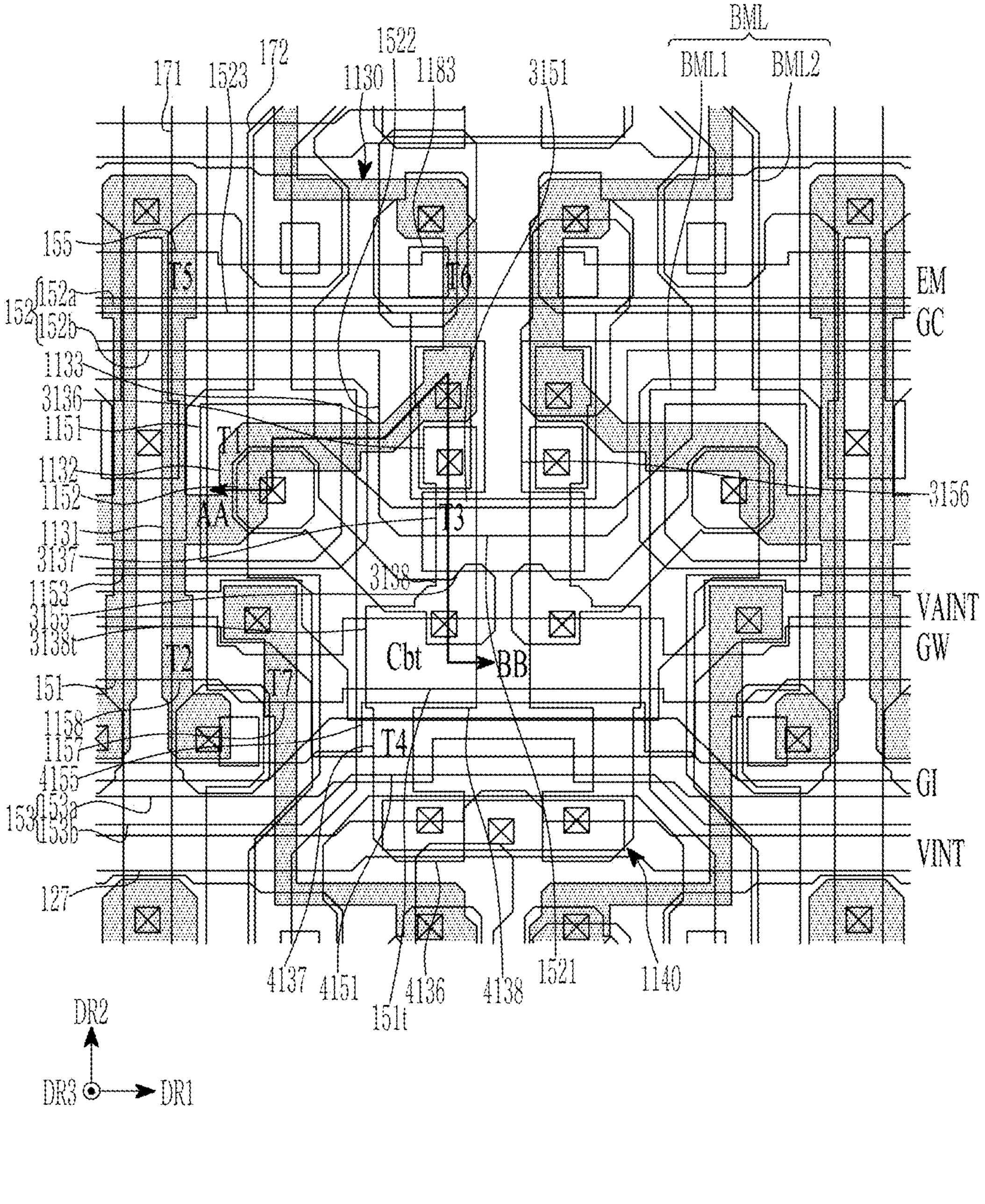
FIG. 14 is a top plan view of two adjacent pixel circuit parts of a display device according to some embodiments.
Figure 15:
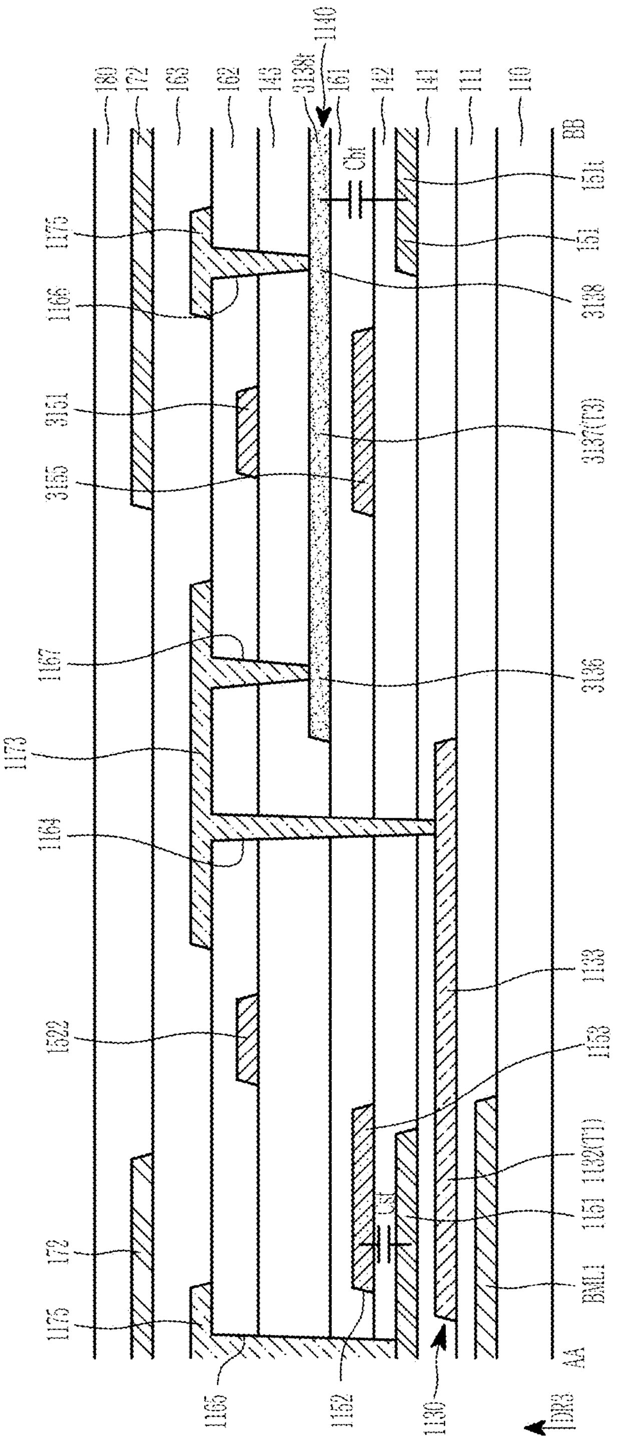
FIG. 15 is a cross-sectional view of a display device shown in FIG. 14 taken along a line AA-BB.

FIG. 14 is a top plan view of two adjacent pixel circuit parts of a display device according to some embodiments. FIG. 15 is a cross-sectional view of a display device shown in FIG. 14 taken along a line AA-BB. FIG. 16 to FIG. 24 are top plan views sequentially illustrating a planar structure of a display device according to some embodiments in a stacking order.

FIG. 14 and FIG. 16 to FIG. 24 illustrate two adjacent pixels in a plane, and two adjacent pixels may have a planar shape that is symmetrical to each other in the first direction DR1. Two pixels may be paired and repeatedly placed in the first direction DR1 and the second direction DR2. However, embodiments according to the present disclosure are not limited thereto, and two adjacent pixels may have shapes in which at least some parts are asymmetrical. Hereinafter, the structure of pixels positioned on the left will be mainly explained. Also, because the seventh transistor T7 is connected to the first gate line 151 of the previous stage, the seventh transistor T7 of the current stage is omitted and instead the seventh transistor T7 of the subsequent stage is drawn.

Figure 16:
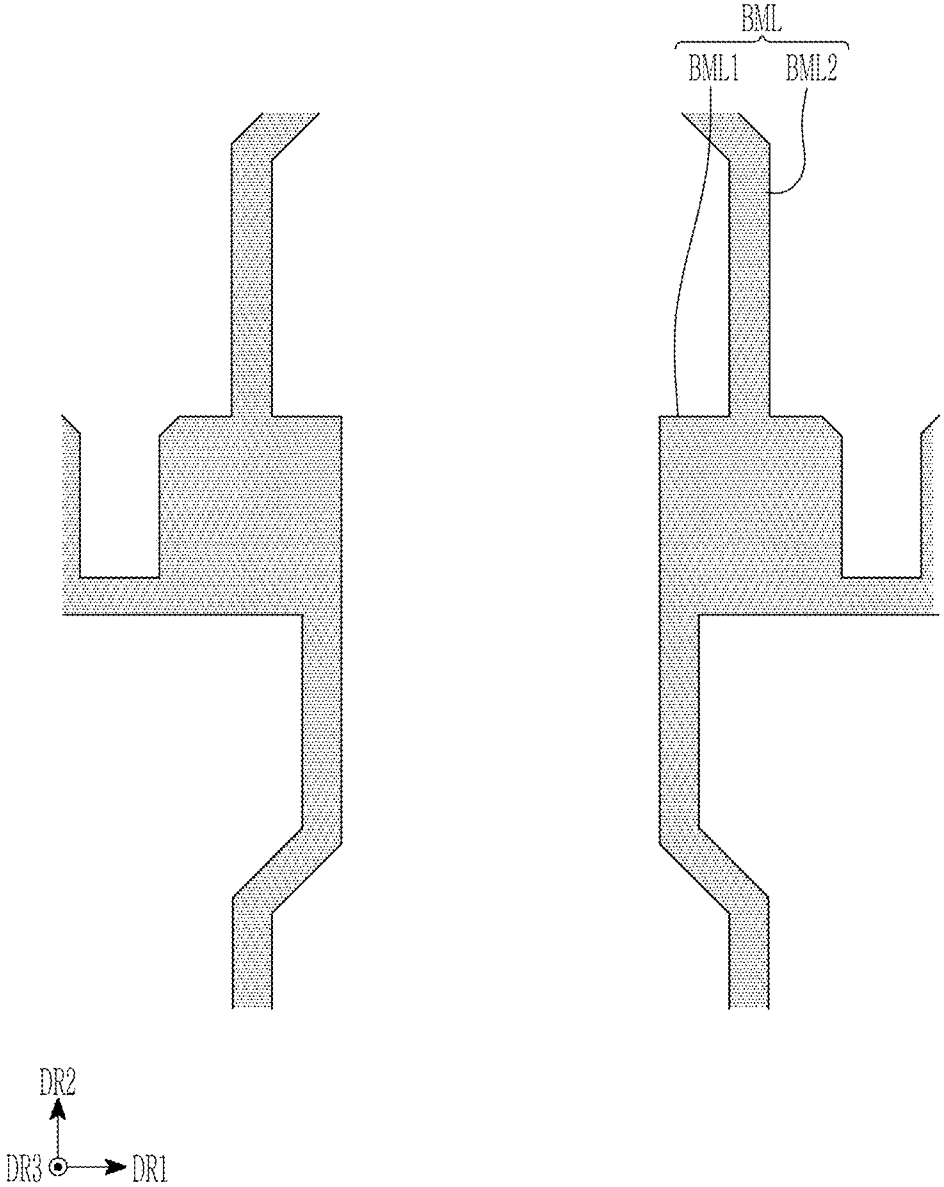
FIG. 16 to FIG. 24 are top plan views sequentially illustrating a planar structure of a display device according to some embodiments in a stacking order.

Referring to FIG. 14, FIG. 15, and FIG. 16, a light blocking layer BML may be positioned on a substrate 110. The substrate 110 may include a material that does not bend due to rigid characteristics such as glass, or a flexible material that may be bent, such as plastic or polyimide. The light blocking layer BML includes a plurality of expansion parts BML1 and a connection part BML2 connecting a plurality of expansion parts BML1 to each other. The expansion part BML1 of the light blocking layer BML may be formed at a position planarly overlapping a channel region 1132 of a first transistor T1, which will be described in more detail later.

The light blocking layer BML is also called a lower shielding layer and can contain metals such as copper (Cu), molybdenum (Mo), aluminum (Al), and titanium (Ti) or metal alloys. According to some embodiments, the light blocking layer BML may include amorphous silicon and may be composed of a single layer or multiple layers.

Referring to FIG. 15, a buffer layer 111 may be positioned on the substrate 110 and the light blocking layer BML. The buffer layer 111 may include an inorganic insulating material or an organic insulating material such as silicon oxide (SiOx), silicon nitride (SiNx), or silicon oxynitride (SiOxNy).

Figure 17:
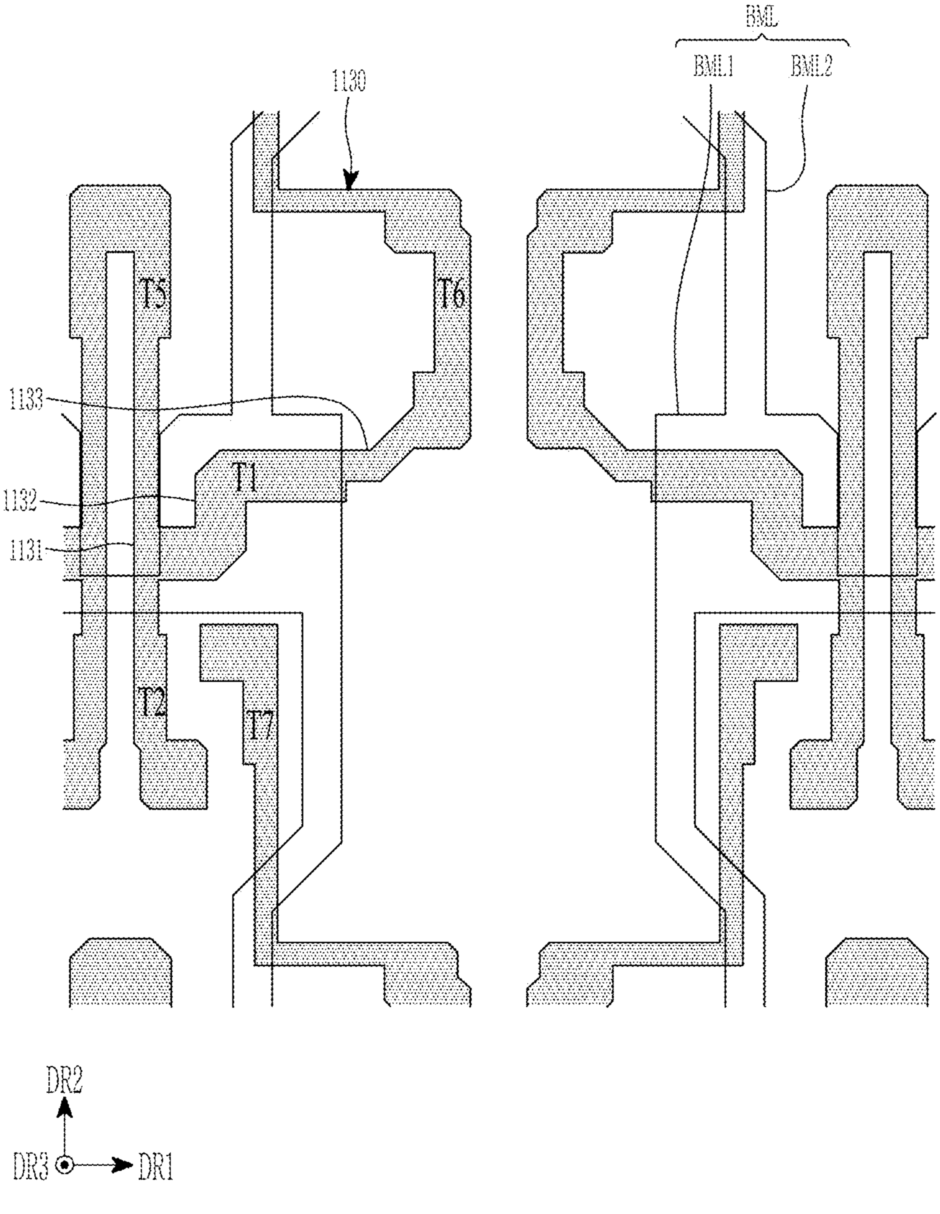

Referring to FIG. 14, FIG. 15, and FIG. 17, a first semiconductor layer 1130 including a channel region 1132, a first electrode 1131, and a second electrode 1133 of a first transistor T1 may be positioned on the buffer layer 111. The first semiconductor layer 1130 may include, for example, a polycrystalline silicon semiconductor material. The first semiconductor layer 1130 may further include a channel region, a first electrode, and a second electrode of each of the second transistor T2, the fifth transistor T5, the sixth transistor T6, and the seventh transistor T7.

The first semiconductor layer 1130 may be formed sequentially along the first transistor T1, the second transistor T2, the fifth transistor T5, the sixth transistor T6, and the seventh transistor T7, and may include a curved portion.

The channel region 1132 of the first transistor T1 may have a planarly curved shape, but is not limited thereto and may be changed in various ways. The first electrode 1131 and the second electrode 1133 of the first transistor T1 may be positioned on both sides of the channel region 1132 of the first transistor T1. The left part of the first electrode 1131 of the first transistor T1 may be planarly extended in the second direction DR2, so that the part extended downwards may be connected to the second electrode of the second transistor T2, and the part extended upwards may be connected to the second electrode of the fifth transistor T5. The second electrode 1133 of the first transistor T1 may be extended upward on the plane and connected to the first electrode of the sixth transistor T6.

Referring to FIG. 15, a first gate insulating layer 141 may be positioned on the first semiconductor layer 1130. The first gate insulating layer 141 may have a single-layer or multi-layer structure. The first gate insulating layer 141 may include an inorganic insulating material such as silicon nitride (SiNx), silicon oxide (SiOx), or silicon oxynitride (SiOxNy).

Figure 18:
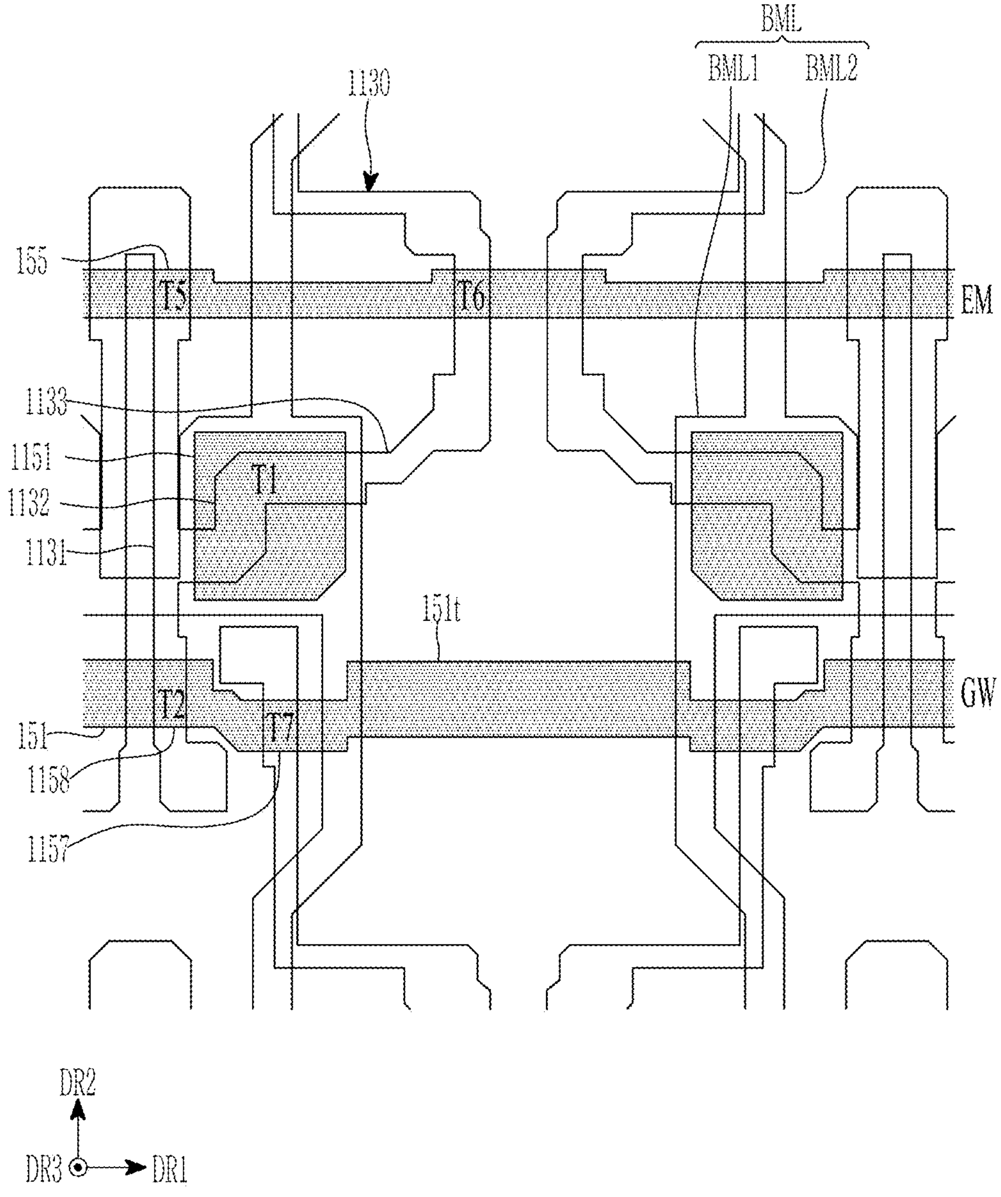

Referring to FIG. 14, FIG. 15, and FIG. 18, a first gate conductive layer including a gate electrode 1151 of the first transistor T1 may be positioned on the first gate insulating layer 141. The first gate conductive layer may have a single-layer or multi-layer structure. The first gate conductive layer may include a metal material such as molybdenum (Mo), aluminum (Al), copper (Cu) and/or titanium (Ti). The first gate conductive layer may further include a gate electrode of each of the second transistor T2, the fifth transistor T5, the sixth transistor T6, and the seventh transistor T7.

The gate electrode 1151 of the first transistor T1 may overlap the channel region 1132 of the first transistor T1. The channel region 1132 of the first transistor T1 is covered by the gate electrode 1151 of the first transistor T1.

The first gate conductive layer may further include a first gate line 151 and a light emission control line 155. The first gate line 151 and the light emission control line 155 may generally be extended in the first direction DR1. The first gate line 151 may be connected to the gate electrode 1158 of the second transistor T2. The first gate line 151 may be formed integrally with the gate electrode 1158 of the second transistor T2. The first gate line 151 may be connected to the gate electrode 1157 of the seventh transistor T7 positioned in the pixel PX of the next stage. The first gate line 151 may be formed integrally with the gate electrode 1157 of the seventh transistor T7. The second gate line connected to the seventh transistor T7 may be formed by the first gate line 151 of the previous stage. The gate electrode of the fifth transistor T5 and the gate electrode of the sixth transistor T6 may be connected to light emission control line 155. The gate electrode of the fifth transistor T5 and the gate electrode of the sixth transistor T6 may be formed integrally with the light emission control line 155.

The first gate line 151 may further include a first boost electrode 151*t*. The first boost electrode 151*t* may be formed integrally with the first gate line 151. The width of the first boost electrode 151*t* in the second direction DR2 may be larger than the width of the gate electrode 1157 of the seventh transistor T7 in the second direction DR2. However, it is not limited thereto, and the width of the first boost electrode 151*t* in the second direction DR2 may be smaller than or equal to the width of the gate electrode 1157 of the seventh transistor T7 or the gate electrode 1158 of the second transistor T2 in the second direction DR2.

The gate electrode 1151 of the first transistor T1 may be positioned between the first gate line 151 and the light emission control line 155 for one pixel and may be island-shaped.

After forming the first gate conductive layer, a doping process for the first semiconductor layer 1130 may be performed. The first semiconductor layer 1130 covered by the first gate conductive layer is not doped, and the first semiconductor layer 1130 that is not covered by the first gate conductive layer is doped and may have the same characteristics as a conductor. At this time, the doping process may be performed with a P-type dopant, and the first transistor T1, the second transistor T2, the fifth transistor T5, the sixth transistor T6, and the seventh transistor T7 including the first semiconductor layer 1130 may have P-type transistor characteristics.

Referring to FIG. 15, a second gate insulating layer 142 may be positioned on the first gate conductive layer and the first gate insulating layer 141. The second gate insulating layer 142 may have a single-layer or multi-layer structure. The second gate insulating layer 142 may include an inorganic insulating material such as silicon nitride ($SiN_x$), silicon oxide ($SiO_x$), or silicon oxynitride ($SiO_xN_y$).

Figure 19:
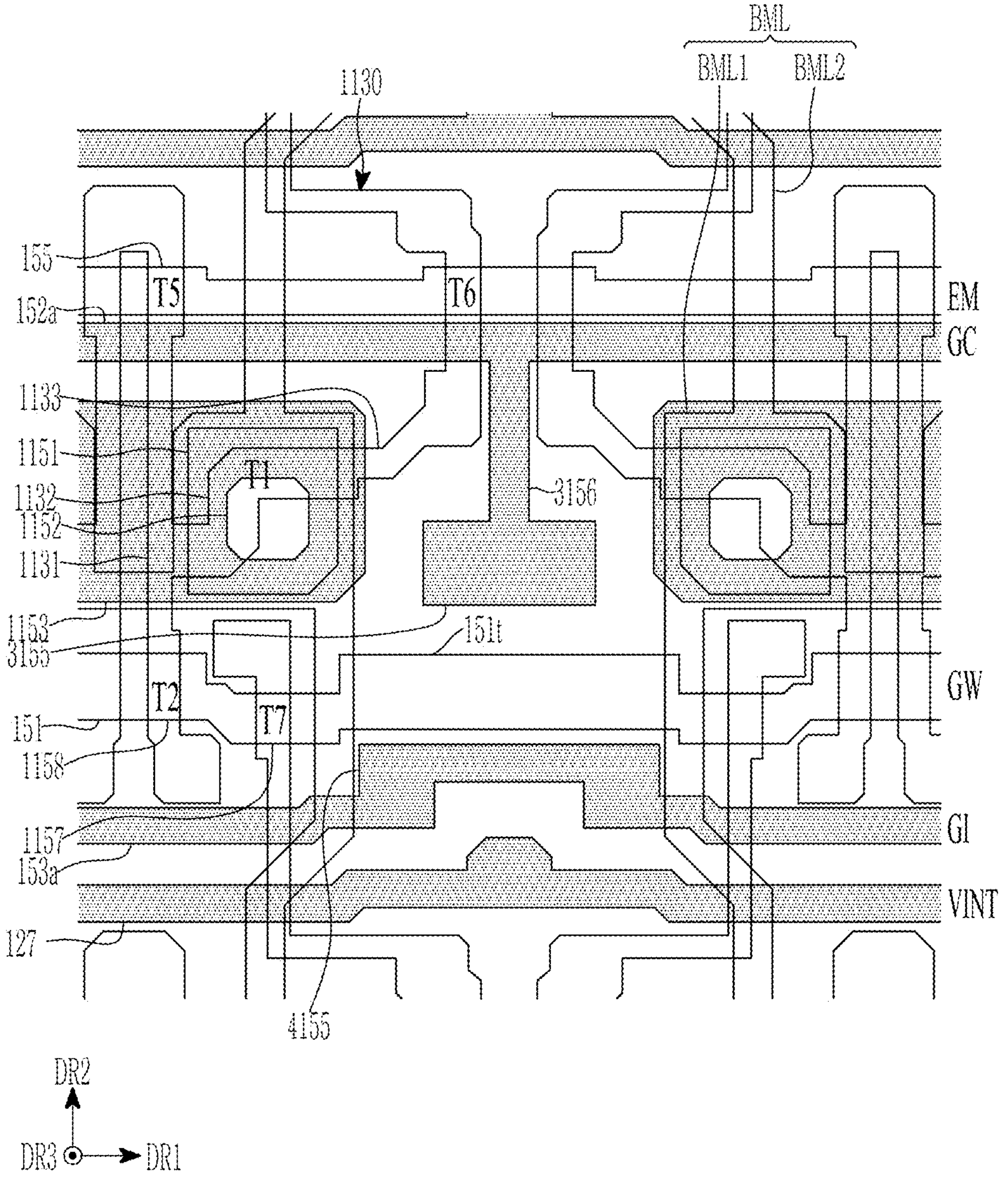

Referring to FIG. 14, FIG. 15, and FIG. 19, a second gate conductive layer including a first storage electrode 1153 of a first capacitor Cst, a light blocking layer 3155 of the third transistor T3, and a light blocking layer 4155 of the fourth transistor T4 may be positioned on the second gate insulating layer 142. The second gate conductive layer may have a single-layer or multi-layer structure. The second gate conductive layer may include a metal material such as molybdenum (Mo), aluminum (Al), copper (Cu) and/or titanium (Ti).

The first storage electrode 1153 overlaps the gate electrode 1151 of the first transistor T1 with the second gate insulating layer 142 in between to form the first capacitor Cst. An opening 1152 is formed in the first storage electrode 1153 of the first capacitor Cst. The opening 1152 may overlap the gate electrode 1151 of the first transistor T1. The light blocking layer 3155 of the third transistor T3 may overlap a channel region 3137 and the gate electrode 3151 of the third transistor T3, as shown in FIG. 14 and FIG. 15. The light blocking layer 4155 of the fourth transistor T4 may overlap a channel region 4137 and a gate electrode 4151 of the fourth transistor T4, which will be described later.

The driving voltage ELVDD may be transmitted to the first storage electrode 1153.

The second gate conductive layer may further include a lower third gate line 152*a*, a lower fourth gate line 153*a*, and a first initialization voltage line 127. The lower third gate line 152*a*, the lower fourth gate line 153*a* and the first initialization voltage line 127 may generally be extended in the first direction DR1. The lower third gate line 152*a* may be connected to the light blocking layer 3155 through a connection part 3156. The lower third gate line 152*a* may be formed integrally with the light blocking layer 3155 and the connection part 3156. The lower fourth gate line 153*a* may be connected to the light blocking layer 4155. The lower fourth gate line 153*a* may be formed integrally with the light blocking layer 4155.

According to some embodiments, at least one of the lower third gate line 152*a* and the lower fourth gate line 153*a* may be omitted.

Referring to FIG. 15, a first interlayer insulating layer 161 may be positioned on the second gate conductive layer. The first interlayer insulating layer 161 may have a single-layer or multi-layer structure. The first interlayer insulating layer 161 may include an inorganic insulating material such as silicon nitride ($SiN_x$), silicon oxide ($SiO_x$), or silicon oxynitride ($SiO_xN_y$).

Figure 20:
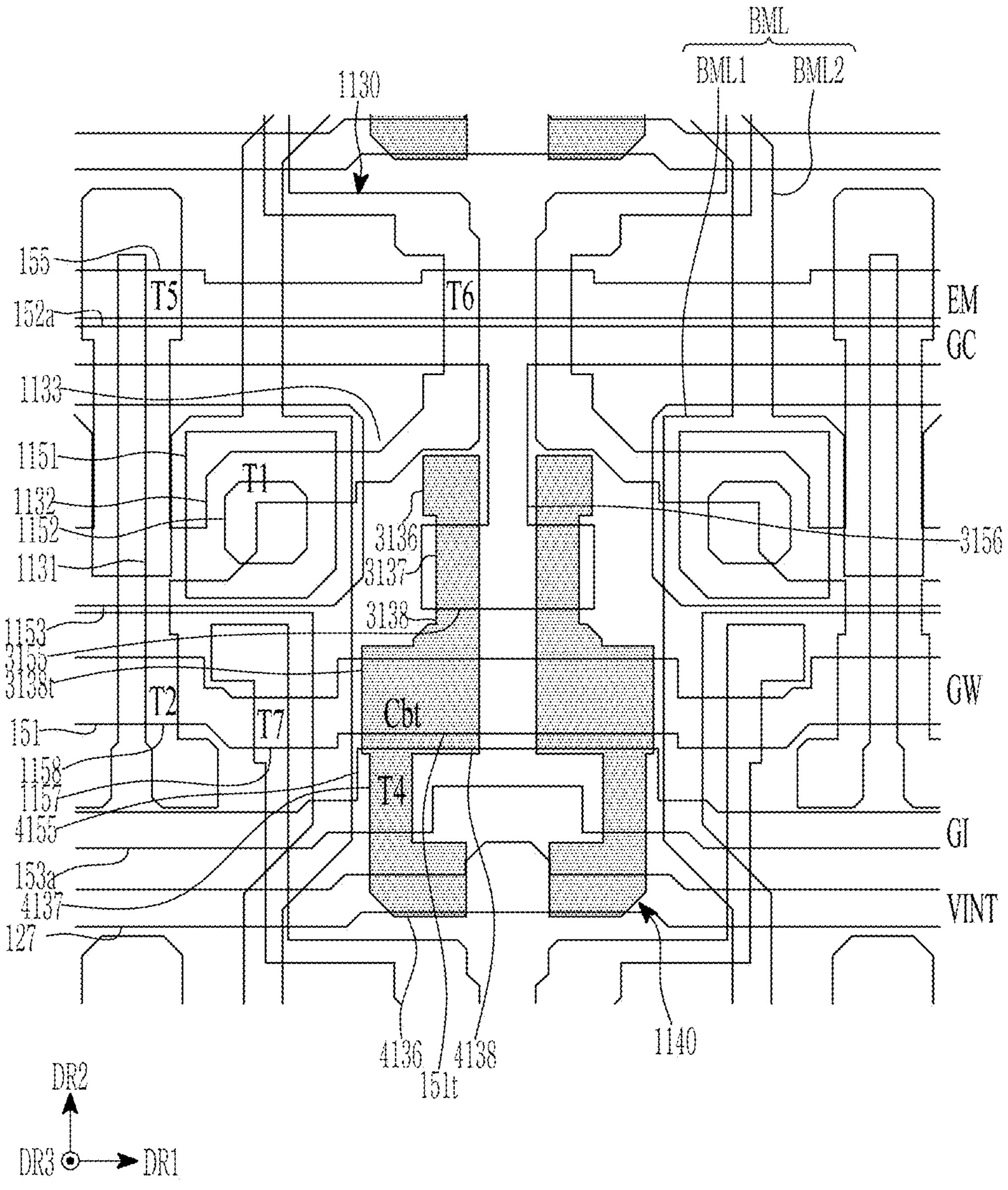

Referring to FIG. 14, FIG. 15, and FIG. 20, a second semiconductor layer 1140 including the channel region 3137, a first electrode 3136, and a second electrode 3138 of the third transistor T3, and the channel region 4137, the first electrode 4136, and the second electrode 4138 of the fourth transistor T4 may be positioned on the first interlayer insulating layer 161. The second semiconductor layer 1140 may include, for example, an oxide semiconductor material.

The second semiconductor layer 1140 may include at least one among a unary metal oxide such as indium (In) oxide, tin (Sn) oxide, or zinc (Zn) oxide, a binary metal oxide such as In—Zn-based oxides, Sn—Zn-based oxides, Al—Zn-based oxides, Zn—Mg-based oxides, Sn—Mg-based oxides, In—Mg-based oxides, or In—Ga-based oxides, a ternary metal oxide such as In—Ga—Zn-based oxides, In—Al—Zn-based oxides, In—Sn—Zn-based oxides, Sn—Ga—Zn-based oxides, Al—Ga—Zn-based oxides, Sn—Al—Zn-based oxides, In—Hf—Zn-based oxides, In—La—Zn-based oxides, In—Ce—Zn-based oxides, In—Pr—Zn-based oxides, In—Nd—Zn-based oxides, In—Sn—Zn-based oxides, In—Eu—Zn-based oxides, In—Gd—Zn-based oxides, In—Tb—Zn-based oxides, In—Dy—Zn-based oxides, In—Ho—Zn-based oxides, In—Er—Zn-based oxides, In—Tm—Zn-based oxides, In—Yb—Zn-based oxides, or In—Lu—Zn-based oxides, and a quaternary metal oxide such as In—Sn—Ga—Zn-based oxides, In—Hf—Ga—Zn-based oxides, In—Al—Ga—Zn-based oxides, In—Sn—Al—Zn-based oxides, In—Sn—Hf—Z-based oxides, or In—Hf—Al—Zn-based oxides. For example, the oxide semiconductor layer may include indium-gallium-zinc oxide (IGZO) among the In—Ga—Zn-based oxides.

The channel region 3137, the first electrode 3136, and the second electrode 3138 of the third transistor T3, and the channel region 4137, the first electrode 4136, and the second electrode 4138 of the fourth transistor T4 may be connected to each other and integrally formed. The first electrode 3136 and the second electrode 3138 of the third transistor T3 may be positioned on both sides of the channel region 3137 of the third transistor T3. The first electrode 4136 and the second electrode 4138 of the fourth transistor T4 may be positioned on both sides of the channel region 4137 of the fourth transistor T4. The second electrode 3138 of the third transistor T3 may be connected to the second electrode 4138 of the fourth transistor T4. The channel region 3137 of the third transistor T3 may overlap the light blocking layer 3155. The channel region 4137 of the fourth transistor T4 may overlap the light blocking layer 4155.

The second semiconductor layer 1140 may further include a second boost electrode 3138*t*, which is a part of a conductive region. The second boost electrode 3138*t* may be connected to the second electrode 3138 of the third transistor T3. The second boost electrode 3138*t* may be formed integrally with the second electrode 3138 of the third transistor T3. The second boost electrode 3138*t* may be connected to the second electrode 4138 of the fourth transistor T4. The second boost electrode 3138*t* may be formed integrally with the second electrode 4138 of the fourth transistor T4.

The second boost electrode 3138*t* may overlap the first boost electrode 151*t* with the second gate insulating layer 142 and the first interlayer insulating layer 161 therebetween. That is, the first gate line 151 may intersect and overlap the second semiconductor layer 1140.

Referring to FIG. 15, a third gate insulating layer 143 may be positioned on the second semiconductor layer 1140. The third gate insulating layer 143 may cover the upper surfaces and the side surfaces of the channel region 3137, the first electrode 3136, and the second electrode 3138 of the third transistor T3, and the channel region 4137, the first electrode 4136, and the second electrode 4138 of the fourth transistor T4. The third gate insulating layer 143 may be formed on the entire surface of the substrate 110, and may overlap the channel region 3137 of the third transistor T3 and the channel region 4137 of the fourth transistor T4, but may not overlap the remaining portions. The third gate insulating layer 143 may have a single-layer or multi-layer structure. The third gate insulating layer 143 may include an inorganic insulating material such as silicon nitride ($SiN_x$), silicon oxide ($SiO_x$), or silicon oxynitride ($SiO_xN_y$).

Figure 21:
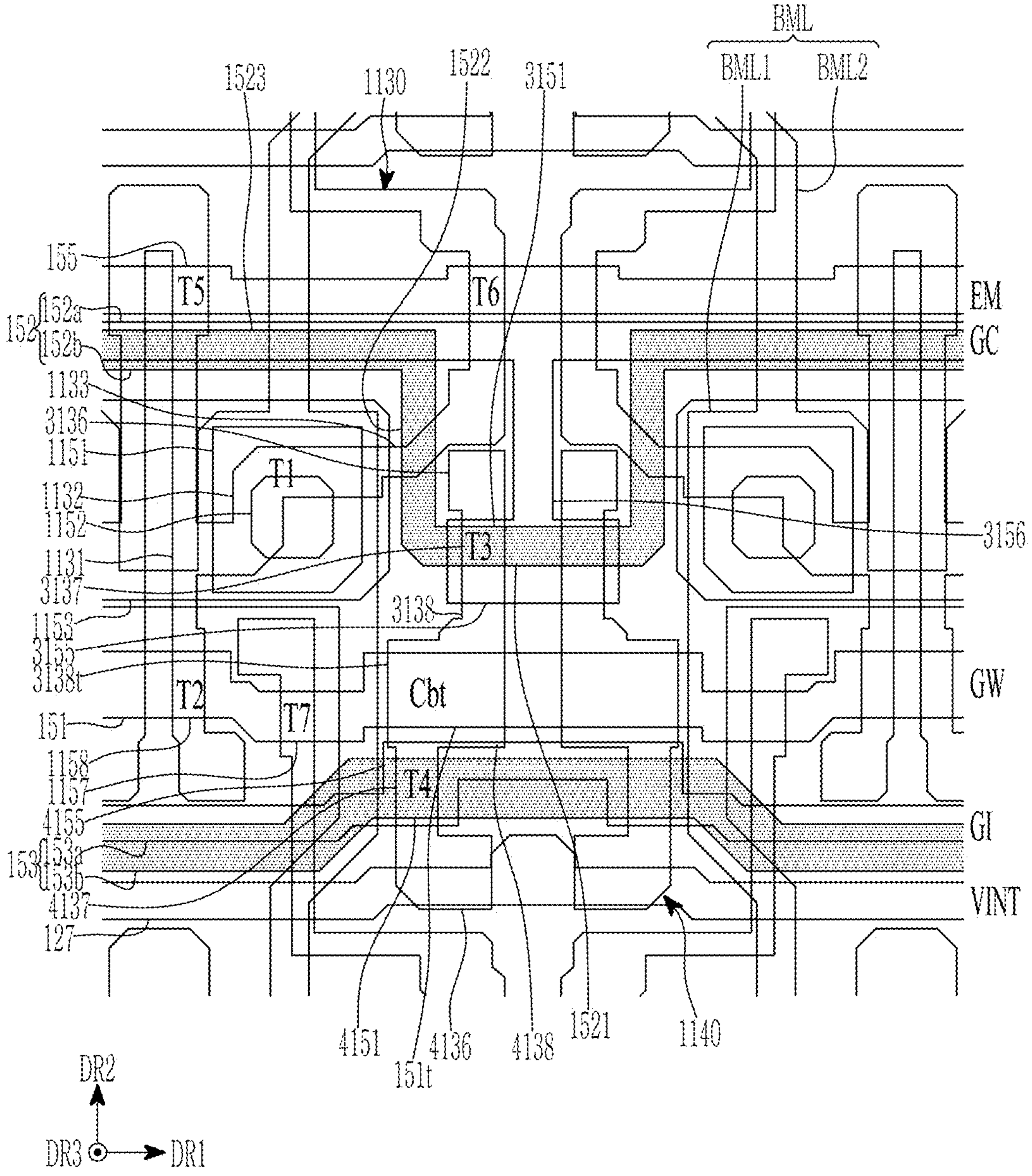

Referring to FIG. 14, FIG. 15, and FIG. 21, a third gate conductive layer including a gate electrode 3151 of the third transistor T3 and a gate electrode 4151 of the fourth transistor T4 may be positioned on the third gate insulating layer 143. The third gate conductive layer may have a single-layer or multi-layer structure. The third gate conductive layer may include a metal material such as molybdenum (Mo), aluminum (Al), copper (C) and/or titanium (Ti).

The gate electrode 3151 of the third transistor T3 may overlap the channel region 3137 of the third transistor T3.

The gate electrode 4151 of the fourth transistor T4 may overlap the channel region 4137 of the fourth transistor T4. The gate electrode 4151 of the fourth transistor T4 may overlap the light blocking layer 4155.

The third gate conductive layer may further include an upper third gate line 152*b* and an upper fourth gate line 153*b*.

The upper third gate line 152*b* forms the third gate line 152 together with the lower third gate line 152*a*. The same gate signal (e.g., the same third gate signal GC) may be applied to the upper third gate line 152*b* and the lower third gate line 152*a*. The upper third gate line 152*b* and the lower third gate line 152*a* may be electrically connected to each other. The upper third gate line 152*b* and the lower third gate line 152*a* may be electrically connected to each other outside the display area or may be electrically connected to each other inside the display area. The upper third gate line 152*b* may be connected to the gate electrode 3151 of the third transistor T3. The upper third gate line 152*b* may be formed integrally with the gate electrode 3151 of the third transistor T3. That is, the upper third gate line 152*b* may include the gate electrode 3151 of the third transistor T3.

The thickness of the first interlayer insulating layer 161 in the third direction DR3 between the light blocking layer 3155 forming the bottom gate electrode of the third transistor T3 and the channel region 3137 of the third transistor T3 may be smaller than the thickness of the third gate insulating layer 143 in the third direction DR3 between the gate electrode 3151 and the channel region 3137 forming the top gate electrode of the third transistor T3. Accordingly, more electrons accumulated in the third transistor T3 may escape toward the light blocking layer 3155.

Within the region of the display area or the pixel PX, the upper third gate line 152*b* may have a planar shape that is generally different from the lower third gate line 152*a*. Referring to FIG. 14 and FIG. 21, the upper third gate line 152*b* may be periodically curved. Specifically, the upper third gate line 152*b* may include a first portion 1521 extending generally in the first direction DR1, a second portion 1522 bent from the first portion 1521 and extending generally in the second direction DR2, and a third portion 1523 bent from the second portion 1522 and extending generally in the first direction DR1.

The upper fourth gate line 153*b* may overlap the lower fourth gate line 153*a*. The upper fourth gate line 153*b*, together with the lower fourth gate line 153*a*, forms the fourth gate line 153. The same gate signal (e.g., the same fourth gate signal GI) may be applied to the upper fourth gate line 153*b* and the lower fourth gate line 153*a*. The upper fourth gate line 153*b* and the lower fourth gate line 153*a* may be electrically connected to each other. The upper fourth gate line 153*b* and the lower fourth gate line 153*a* may be electrically connected to each other outside the display area or may be electrically connected to each other inside the display area. The upper fourth gate line 153*b* may be connected to the gate electrode 4151 of the fourth transistor T4. The upper fourth gate line 153*b* may be formed integrally with the gate electrode 4151 of the fourth transistor T4. That is, the upper fourth gate line 153*b* may include the gate electrode 4151 of the fourth transistor T4.

After forming the third gate conductive layer, a doping process for the second semiconductor layer 1140 may be performed. The portion of the second semiconductor layer 1140 covered by the third gate conductive layer is not doped, and the portion of the second semiconductor layer 1140 that is not covered by the third gate conductive layer is doped and may have the same characteristics as a conductor. The channel region 3137 of the third transistor T3 may be positioned below the gate electrode 3151 so as to overlap the gate electrode 3151. The first electrode 3136 and the second electrode 3138 of the third transistor T3 may not overlap the gate electrode 3151. The channel region 4137 of the fourth transistor T4 may be positioned below the gate electrode 4151 so as to overlap the gate electrode 4151. The first electrode 4136 and the second electrode 4138 of the fourth transistor T4 may not overlap the gate electrode 4151. The second boost electrode 3138*t* may not overlap the third gate conductive layer. The doping process of the second semiconductor layer 1140 may be carried out with an N-type dopant, and the third transistor T3 and the fourth transistor T4 including the second semiconductor layer 1140 may have N-type transistor characteristics.

Referring to FIG. 15, a second interlayer insulating layer 162 may be positioned on the third gate conductive layer. The second interlayer insulating layer 162 may have a single-layer or multi-layer structure. The second interlayer insulating layer 162 may include an inorganic insulating material such as silicon nitride ($SiN_x$), silicon oxide ($SiO_x$), or silicon oxynitride ($SiO_xN_y$).

Figure 22:
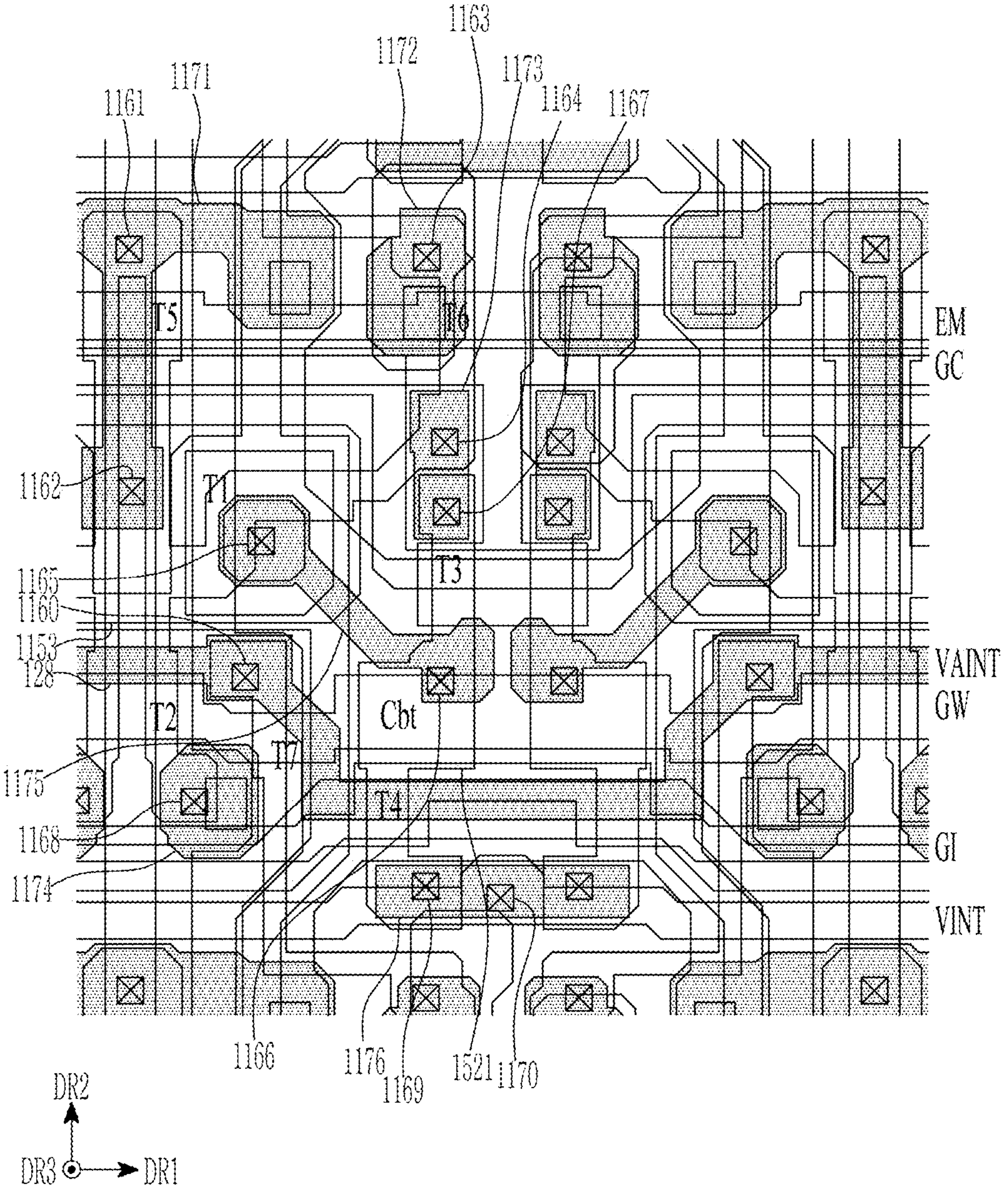

Referring to FIG. 14, FIG. 15, and FIG. 22, the second interlayer insulating layer 162 and the third gate insulating layer 143 may include a plurality of openings 1160, 1161, 1162, 1163, 1164, 1165, 1166, 1167, 1168, 1169, and 1170.

A first data conductive layer including a plurality of connection electrodes 1171, 1172, 1173, 1174, 1175, and 1176 may be positioned above the second interlayer insulating layer 162. The first data conductive layer may have a single-layer or multi-layer structure. The first data conductive layer may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu).

The connection electrode 1175 may planarly overlap the gate electrode 1151 of the first transistor T1. The connection electrode 1175 may be electrically connected to the gate electrode 1151 of the first transistor T1 through the opening 1165.

At least a part of the connection electrode 1175 may overlap a second capacitor Cbt. The connection electrode 1175 may be connected to the second boost electrode 3138*t* of the second capacitor Cbt through the opening 1166. Therefore, the gate electrode 1151 of the first transistor T1 and the second boost electrode 3138*t* of the second capacitor Cbt may be connected to each other by the connection electrode 1175. The gate electrode 1151 of the first transistor T1 may also be electrically connected to the second electrode 3138 of the third transistor T3 and the second electrode 4138 of the fourth transistor T4 by the connection electrode 1175.

A connection electrode 1173 may overlap the second electrode 1133 of the first transistor T1. The connection electrode 1173 may be electrically connected to the second electrode 1133 of the first transistor T1 through an opening 1164. The connection electrode 1173 may overlap the first electrode 3136 of the third transistor T3. The connection electrode 1173 may be electrically connected to the first electrode 3136 of the third transistor T3 through an opening 1167. Therefore, the second electrode 1133 of the first transistor T1 and the first electrode 3136 of the third transistor T3 may be electrically connected by the connection electrode 1173.

The connection electrode 1174 may be electrically connected to the first electrode of the second transistor T2 through an opening 1168. The connection electrode 1171 may be electrically connected to the first electrode of the fifth transistor T5 through the opening 1161 and to the first storage electrode 1153 through an opening 1162. The connection electrode 1172 may be electrically connected to the second electrode of the sixth transistor T6 through an opening 1163.

The first data conductive layer may further include a second initialization voltage line 128. The second initialization voltage line 128 may generally be extended in the first direction DR1.

Referring to FIG. 15, a third interlayer insulating layer 163 may be positioned above the first data conductive layer. The third interlayer insulating layer 163 may have a single-layer or multi-layer structure. The third interlayer insulating layer 163 may include an organic insulating material or an inorganic insulating material such as a general-purpose polymer such as polymethyl methacrylate (PMMA) or polystyrene (PS), a polymer derivative having a phenolic group, an acrylic-based polymer, an imide-based polymer (such as a polyimide), an acrylate-based polymer, a siloxane-based polymer, or the like. The third interlayer insulating layer 163 may include a plurality of openings 1182, 1183, and 1181 positioned above the connection electrodes 1171, 1172, and 1174, respectively.

Figure 23:
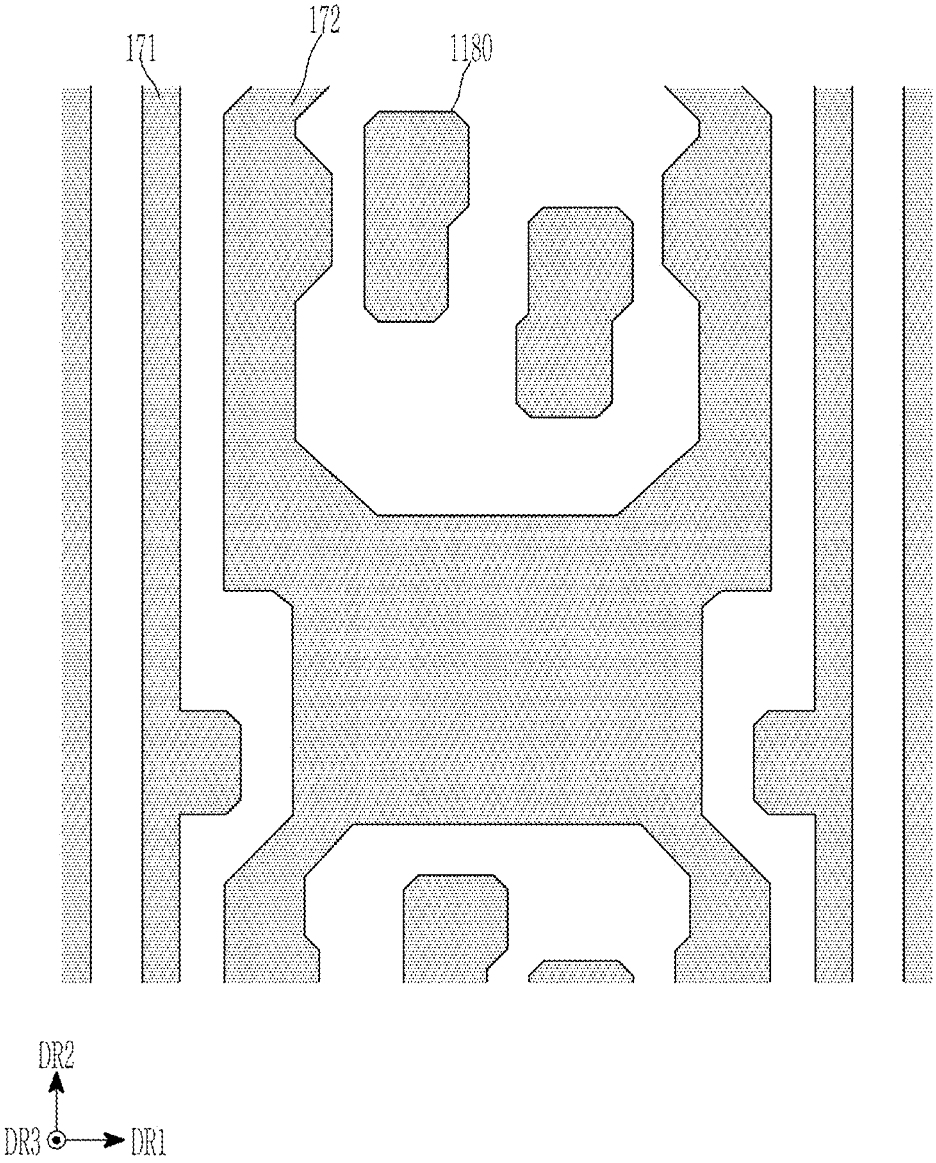
Figure 24:
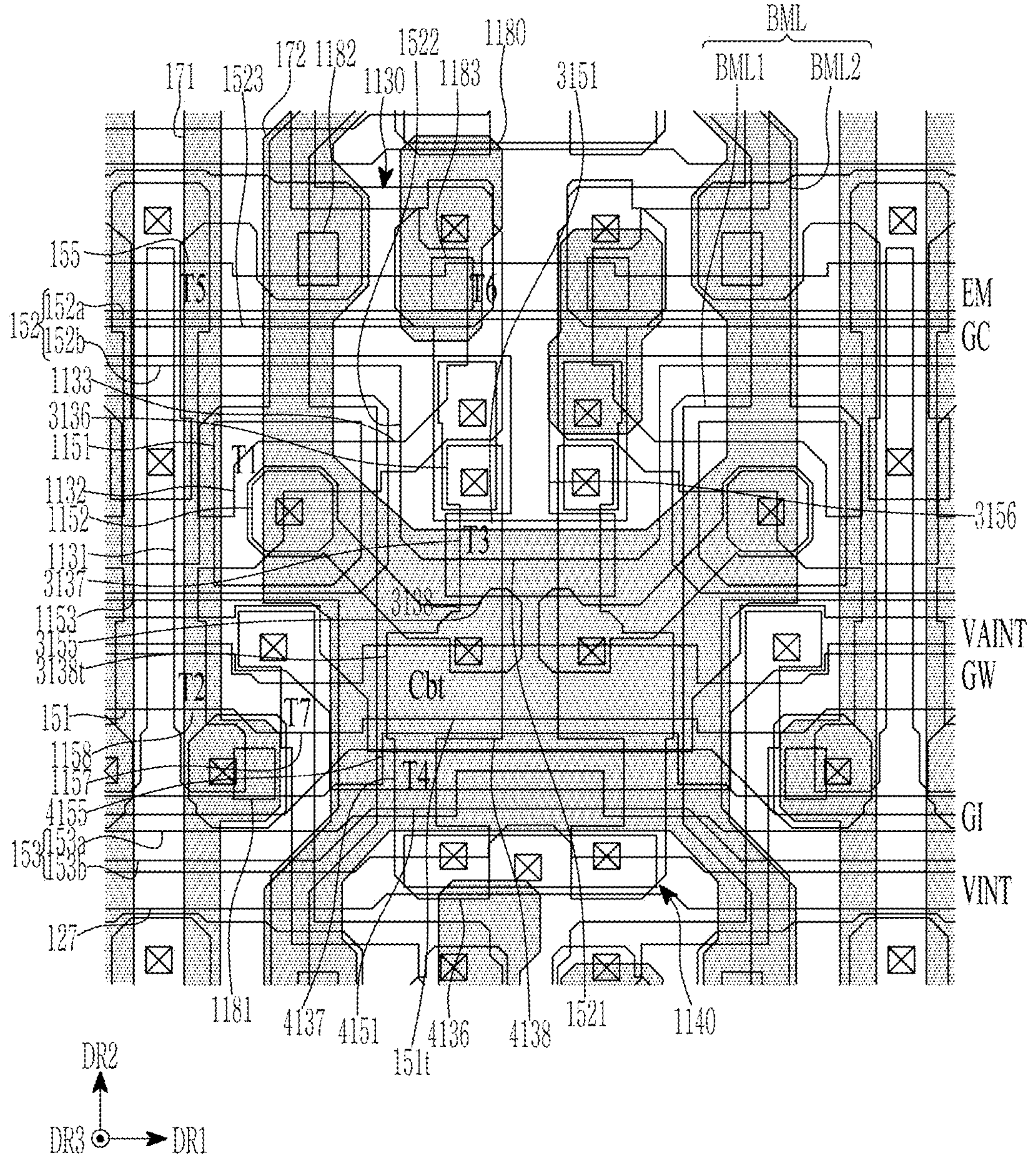

Referring to FIG. 14, FIG. 15, FIG. 23, and FIG. 24, a second data conductive layer including a data line 171 and a driving voltage line 172 may be positioned above the third interlayer insulating layer 163. For ease of understanding, FIG. 23 shows only the second data conductive layer separately. Referring to FIG. 23 and FIG. 24, the data line 171 and the driving voltage line 172 may be extended substantially in the second direction DR2.

The data line 171 may be electrically connected to the lower connection electrode 1174 through the opening 1181 of the third interlayer insulating layer 163, thereby may be electrically connected to the first electrode of the second transistor T2.

The driving voltage line 172 may be electrically connected to the lower connection electrode 1171 through the opening 1182 of the third interlayer insulating layer 163, thereby can be electrically connected to the first electrode the fifth transistor T5 and the first storage electrode 1153.

The second data conductive layer may further include a connection electrode 1180. The connection electrode 1180 may be electrically connected to the lower connection electrode 1172 through the opening 1183 of the third interlayer insulating layer 163, thereby can be electrically connected to the second electrode of the sixth transistor T6.

The second data conductive layer may have a single-layer or multi-layer structure. The second data conductive layer may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu).

A passivation layer 180 may be positioned above the data line 171 and the driving voltage line 172, and an anode may be positioned above the passivation layer 180. The passivation layer 180 may include an organic insulating material. The anode may be electrically connected to the sixth transistor T6 and may receive the output current of the first transistor T1. A barrier rib may be positioned on the anode. An opening may be formed in the barrier rib, and the opening of the barrier rib may overlap the anode. A light emitting element layer may be positioned within the opening of the barrier rib. A cathode may be positioned on the light emitting element layer and the barrier rib. The anode, the light emitting element layer, and the cathode form a light emitting element LD, which may be a light emitting diode.

While aspects of some embodiments have been described in connection with what is presently considered to be practical embodiments, it is to be understood that embodiments according to the present disclosure are not limited to the disclosed embodiments, but, on the contrary, is intended to cover various modifications and equivalent arrangements included within the spirit and scope of the appended claims.

The display device according to the above embodiments can be applied to various electronic devices. An electronic device according to an embodiment comprises the aforementioned display device and may further comprise a module or a device with additional functions other than the display device.

Figure 25:
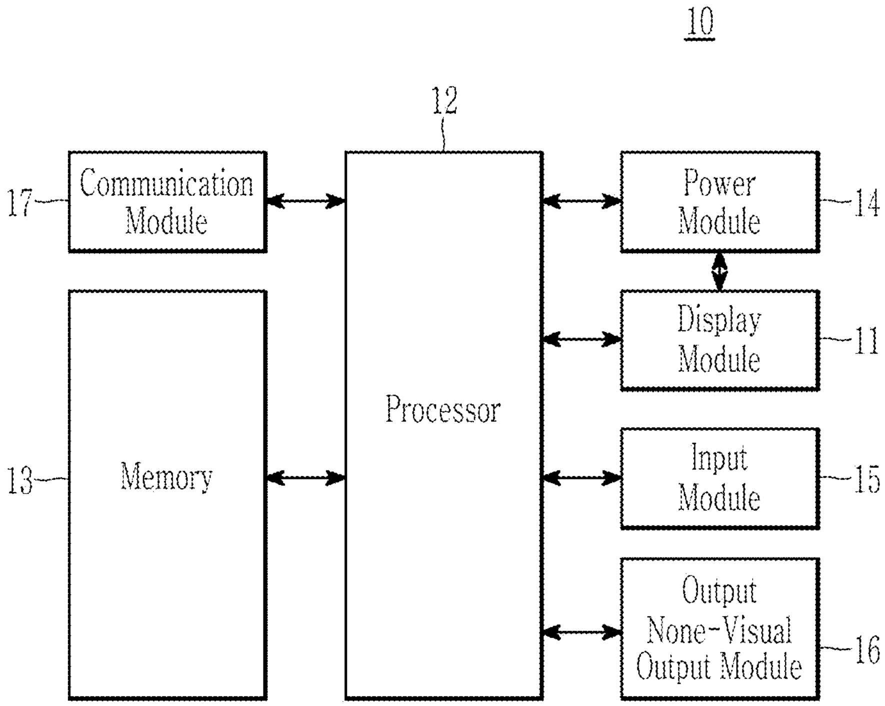
FIG. 25 is a block diagram of an electronic device according to an embodiment.

FIG. 25 is a block diagram of an electronic device according to an embodiment. Referring to FIG. 25, an electronic device 10 according to an embodiment may comprise a display module 11, a processor 12, a memory 13, and a power module 14. The electronic device 10 may further comprise an input module 15, a non-visual output module 16, and/or a communication module 17. The display module 11 may comprise a display device 1000 according to an embodiment as described above.

The electronic device 10 may output various information in the form of images via the display module 11. When the processor 12 executes an application stored in the memory 13, an image information provided from the application may be provided to a user via the display module 11. The power module 14 may comprise a power supply module such as a power adapter or a battery device, and a power conversion module that converts the power supplied by the power supply module to generate the power necessary for operation of the electronic device 10. The input module 15 may provide an input information to the processor 12 and/or the display module 11. The non-visual output module 16 may receive information other than the image information, such as sound, haptic, or light information provided from the processor 12, and provide it to the user. The communication module 17 is responsible for transmitting and receiving information between the electronic device 10 and an external device, and may comprise a receiver and a transmitter.

At least one of the aforementioned components of the electronic device 10 may be included within the display device 1000 according to the above-described embodiments. In addition, some of the individual modules that are functionally included in one module may be included within the display device 1000, while others may be provided separately from the display device 1000. For example, a display device 1000 according to an embodiment may include the display module 11, while the processor 12, the memory 13, and the power module 14 may be provided in a form of other devices within the electronic device 10, not within the display device 1000.

Figure 26:
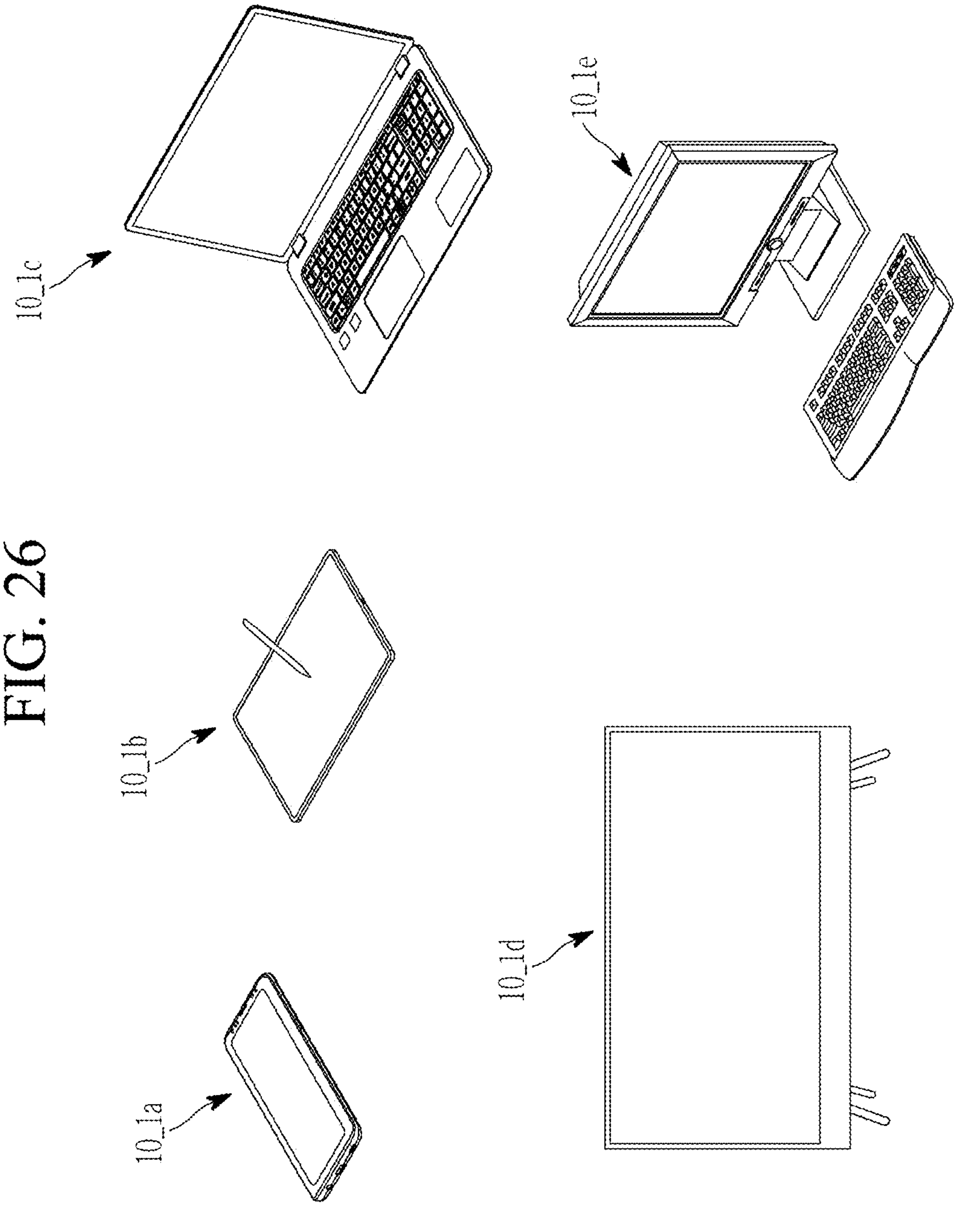
FIG. 26 to FIG. 28 are schematic diagrams of electronic devices according to various embodiments.
Figure 27:
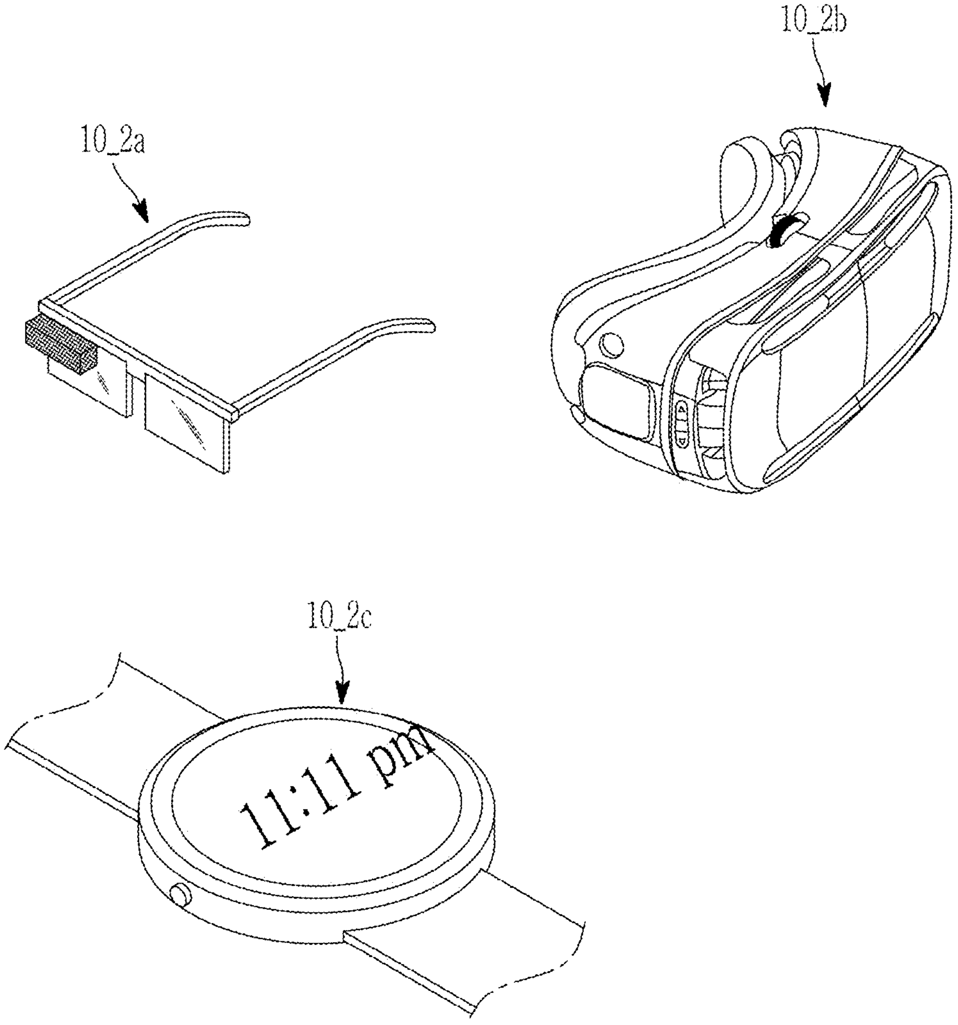
Figure 28:
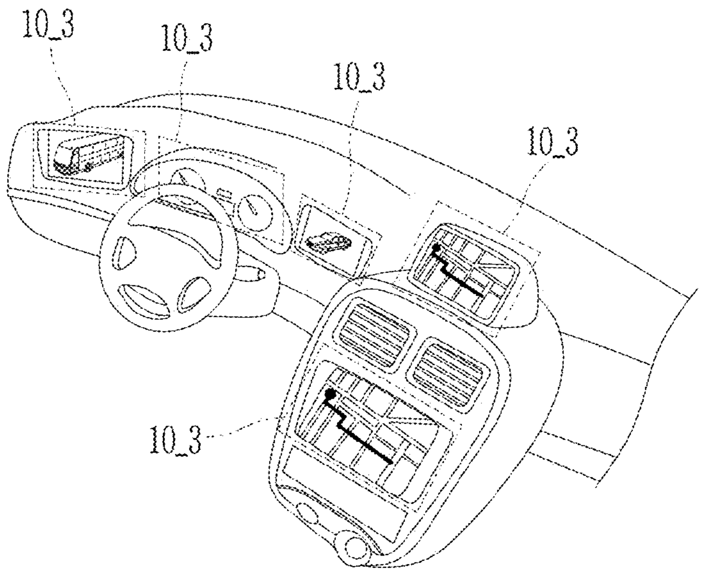

FIG. 26 to FIG. 28 are schematic diagrams of electronic devices according to various embodiments. FIG. 26 to FIG. 28 illustrate examples of various electronic devices to which a display device 1000 according to an embodiment is applied.

FIG. 26 illustrates examples of electronic devices, including a smartphone 10_1*a*, a tablet PC 10_1*b*, a laptop 10_1*c*, a television (TV) 10_1*d*, and a desktop monitor 10_1*e*.

A smartphone 10_1*a* may comprise an input module such as a touch sensor and a communication module in addition to the display module. The smartphone 10_1*a* may process information received through the communication module or other input modules and display the information through the display module of the display device 1000.

Each of the tablet PC 10_1*b*, the laptop 10_1*c*, the TV 10_1*d*, and the desktop monitor 10_1*e* may comprise a display module and an input module similar to the smartphone 10_1*a*, and may additionally comprise a communication module depending on embodiments.

FIG. 27 illustrates an example where an electronic device including a display module is applied to a wearable electronic device. The wearable electronic device may be smart glasses 10_2*a*, a head-mounted display 10_2*b*, a smart watch 10_2*c*, and so on.

The smart glasses 10_2*a* and the head-mounted display 10_2*b* may comprise a display module that projects display images and a reflector that reflects the projected display images to provide it to a user's eyes, through which, a screen of virtual reality or augmented reality may be provided to the user.

The smart watch 10_2*c* may comprise a biometric sensor as an input device, and may provide biometric information recognized through the biometric sensor to a user via a display module.

FIG. 28 illustrates an example of an electronic device including a display module applied to a vehicle. For example, an electronic device 10_3 may be applied to an instrument panel, or a center fascia, etc. of a car, or it may be applied to a CID (Center Information Display) placed on a dashboard of a car, or it may be applied to a room mirror display replacing a side mirror.

Although not illustrated, an electronic device to which a display device according to embodiments is applied may include not only devices primarily focused on screen display such as a billboard, an electronic signboard, and a gaming machine, but also various home appliances that display information through a display module, such as a refrigerator, a washing machine, a dryer, an air conditioner, and a robot vacuum cleaner. Furthermore, when the display module has a light-transmitting function, it can be applied to an electronic device such as a smart window or a transparent display device that show both the background and a displayed image. The types of electronic devices according to the embodiments are not limited to the examples given above, and application to various other electronic devices not mentioned may also be possible.

DESCRIPTION OF SOME OF THE REFERENCE SYMBOLS

110: substrate
111: buffer layer
127, 128: initialization voltage line
141, 142, 143: gate insulating layer
151, 152*a*, 152*b*, 153, 153*a*, 153*b*, GL: gate line
155, EML: light emission control line
161, 162, 163: interlayer insulating layer
171, DL: data line
172: driving voltage line
180: passivation layer
300: display panel
400: gate driver
450: light emission control driver
500: data driver
600: timing controller
700: power supply unit
1000: display device
1130, 1140: semiconductor layer
1131, 3136, 4136: first electrode
1132, 3137, 4137, Ch: channel region
1133, 3138, 4138: second electrode
1151, 1157, 1158, 3151, 4151: gate electrode
1153: storage electrode
1171, 1172, 1173, 1174, 1175, 1176, 1180: connection electrode
3155, 4155: light blocking layer

What is claimed is:

1. A display device, wherein the display device comprises:

a display panel including a plurality of pixels, a plurality of gate lines, and a plurality of data lines;

a gate driver configured to generate a third gate signal and to transmit it to a third gate line included in the plurality of gate lines; and a data driver configured to generate a data signal and to transmit it to the plurality of data lines, wherein the pixel includes:

a first transistor including a first electrode connected to a first node, a second electrode connected to a second node, and a first gate electrode connected to a third node;

a third transistor including a first electrode connected to the second node, a second electrode connected to the third node, and a third gate electrode connected to the third gate line; and a light emission control transistor connected to the first node or the second node and including a light emission control gate electrode configured to receive a light emission control signal, wherein the gate driver is further configured to output a gate signal to the plurality of gate lines during an operation period of each frame, and to not output the gate signal to the plurality of gate lines during a blank period between the operation periods of adjacent frames, and the third gate signal includes a first turn-on voltage level period during a non-light emitting period wherein the light emission control signal is in a turn-off voltage level, and includes an additional pulse period positioned in at least one of a light emitting period wherein the light emission control signal is in a turn-on voltage level and the blank period.

2. The display device of claim 1, wherein the additional pulse period includes an on-pulse of at least one turn-on voltage level.

3. The display device of claim 2, wherein a pulse width of the on-pulse is smaller than a width of the first turn-on voltage level period.

4. The display device of claim 1, wherein:

the blank period includes a first porch period after the operation period of each frame, and a second porch period before the operation period of each frame, and the additional pulse period is in the first porch period.

5. The display device of claim 4, wherein:

the first porch period is included within the light emitting period.

6. The display device of claim 1, wherein:

the operation period includes an address scan period in which the third gate signal includes the first turn-on voltage level period, and a self-scan period in which the third gate signal does not include the first turn-on voltage level period, and the additional pulse period is positioned within at least one of the light emitting period included in the address scan period and the light emitting period included in the self-scan period.

7. The display device of claim 1, wherein: the additional pulse period is positioned once every one frame to five frames.

8. The display device of claim 1, wherein: the third transistor is an N-type transistor including an oxide semiconductor.

9. The display device of claim 1, wherein: the third transistor includes:

a bottom gate electrode on a substrate;

a first insulating layer on the bottom gate electrode;

a semiconductor layer on the first insulating layer;

a second insulating layer on the semiconductor layer; and a top gate electrode on the second insulating layer, wherein a thickness of the first insulating layer is smaller than a thickness of the second insulating layer.

10. The display device of claim 9, wherein: the bottom gate electrode and the top gate electrode are configured to receive the same third gate signal.

11. A driving method of a display device, wherein the driving method of the display device comprises:

in the display device including a display panel including a plurality of pixels, a plurality of gate lines, and a plurality of data lines, a gate driver, and a data driver, wherein the pixels comprise a first transistor including a first electrode connected to a first node, a second electrode connected to a second node, and a first gate electrode connected to a third node, a third transistor including a first electrode connected to the second node, a second electrode connected to the third node, and a third gate electrode connected to a third gate line included in the plurality of gate lines, and a light emission control transistor connected to the first node or the second node and including a light emission control gate electrode that receives a light emission control signal;

generating a third gate signal by the gate driver to be transmitted to the third gate line; and generating a data signal by the data driver to be transmitted to the plurality of data lines, wherein the gate driver outputs a gate signal to the plurality of gate lines during an operation period of each frame, and does not output the gate signal to the plurality of gate lines during a blank period between the operation periods of adjacent frames, and the third gate signal includes a first turn-on voltage level period during a non-light emitting period wherein the light emission control signal is in a turn-off voltage level, and includes an additional pulse period positioned in at least one of a light emitting period wherein the light emission control signal is in a turn-on voltage level and the blank period.

12. The driving method of the display device of claim 11, wherein: the additional pulse period includes an on-pulse of at least one turn-on voltage level.

13. The driving method of the display device of claim 12, wherein: a pulse width of the on-pulse is smaller than a width of the first turn-on voltage level period.

14. The driving method of the display device of claim 11, wherein:

the blank period includes a first porch period after the operation period of each frame, and a second porch period before the operation period of each frame, and the additional pulse period is in the first porch period.

15. The driving method of the display device of claim 14, wherein: the first porch period is included within the light emitting period.

16. The driving method of the display device of claim 11, wherein:

the operation period includes an address scan period in which the third gate signal includes the first turn-on voltage level period, and a self-scan period in which the third gate signal does not include the first turn-on voltage level period, and the additional pulse period is within at least one of the light emitting period included in the address scan period and the light emitting period included in the self-scan period.

17. The driving method of the display device of claim 11, wherein: the additional pulse period is positioned once every one frame to five frames.

18. The driving method of the display device of claim 11, wherein: the third transistor is an n-type transistor including an oxide semiconductor.

19. The driving method of the display device of claim 11, wherein: the third transistor includes:

a bottom gate electrode on a substrate;

a first insulating layer on the bottom gate electrode;

a semiconductor layer on the first insulating layer;

a second insulating layer on the semiconductor layer; and a top gate electrode on the second insulating layer, wherein a thickness of the first insulating layer is smaller than a thickness of the second insulating layer, and the bottom gate electrode and the top gate electrode receive the same third gate signal.

20. An electronic device, wherein the electronic device comprises:

a display module; and a processor electrically connected to the display module, wherein the display module comprises:

a display panel including a plurality of pixels, a plurality of gate lines, and a plurality of data lines;

a gate driver configured to generate a third gate signal and to transmit it to a third gate line included in the plurality of gate lines; and a data driver configured to generate a data signal and to transmit it to the plurality of data lines, wherein the pixel includes:

a first transistor including a first electrode connected to a first node, a second electrode connected to a second node, and a first gate electrode connected to a third node;

a third transistor including a first electrode connected to the second node, a second electrode connected to the third node, and a third gate electrode connected to the third gate line; and a light emission control transistor connected to the first node or the second node and including a light emission control gate electrode configured to receive a light emission control signal, wherein the gate driver is further configured to output a gate signal to the plurality of gate lines during an operation period of each frame, and to not output the gate signal to the plurality of gate lines during a blank period between the operation periods of adjacent frames, and the third gate signal includes a first turn-on voltage level period during a non-light emitting period wherein the light emission control signal is in a turn-off voltage level, and includes an additional pulse period positioned in at least one of a light emitting period wherein the light emission control signal is in a turn-on voltage level and the blank period.

* * * * *